United States Patent
Chen et al.

(10) Patent No.: US 12,335,502 B2
(45) Date of Patent: Jun. 17, 2025

(54) ADAPTIVE BLENDING FOR GEOMETRIC PARTITION MODE (GPM)

(71) Applicant: Tencent America LLC, Palo Alto, CA (US)

(72) Inventors: Lien-Fei Chen, Hsinchu (TW); Guichun Li, San Jose, CA (US); Xiang Li, Saratoga, CA (US); Shan Liu, San Jose, CA (US)

(73) Assignee: TENCENT AMERICA LLC, Palo Alto, CA (US)

( * ) Notice: Subject to any disclaimer, the term of this patent is extended or adjusted under 35 U.S.C. 154(b) by 70 days.

(21) Appl. No.: 18/136,091

(22) Filed: Apr. 18, 2023

(65) Prior Publication Data

US 2023/0345023 A1    Oct. 26, 2023

Related U.S. Application Data

(60) Provisional application No. 63/332,741, filed on Apr. 20, 2022.

(51) Int. Cl.
*H04N 19/44*    (2014.01)
*H04N 19/105*   (2014.01)
(Continued)

(52) U.S. Cl.
CPC .......... *H04N 19/44* (2014.11); *H04N 19/105* (2014.11); *H04N 19/132* (2014.11); *H04N 19/176* (2014.11); *H04N 19/70* (2014.11)

(58) Field of Classification Search
CPC .. H04N 19/105; H04N 19/117; H04N 19/119; H04N 19/132; H04N 19/176; H04N 19/44; H04N 19/70
(Continued)

(56) References Cited

U.S. PATENT DOCUMENTS

2020/0021836 A1* 1/2020 Xu ................ H04N 19/46
2020/0036997 A1* 1/2020 Li ................. H04N 19/139
(Continued)

OTHER PUBLICATIONS

International Search Report and Written Opinion issued Aug. 18, 2023 in Application No. PCT/CN2023/066020 (12 pages).
(Continued)

*Primary Examiner* — Behrooz M Senfi
(74) *Attorney, Agent, or Firm* — ARENTFOX SCHIFF LLP

(57) ABSTRACT

Aspects of the disclosure provide a method and an apparatus including processing circuitry that decodes a value of a syntax element that indicates whether a current block is coded with a geometric partition mode (GPM) along a partition edge intersecting the current block. If the value of the syntax element indicates that the current block is coded with the GPM and a condition for adaptive blending is satisfied, width candidates in a width candidate list are reordered using template matching (TM) that is based on a current template of the current block and reference templates that correspond to the respective width candidates. A width candidate is selected from the reordered width candidate list. A width of a blending area defined by boundaries on both sides of the partition edge is determined based on the selected width candidate. The blending area is determined based on the width of the blending area.

20 Claims, 13 Drawing Sheets

(51) Int. Cl.
  *H04N 19/132* (2014.01)
  *H04N 19/176* (2014.01)
  *H04N 19/70* (2014.01)
(58) Field of Classification Search
  USPC .................................................. 375/240.25
  See application file for complete search history.

(56) References Cited

U.S. PATENT DOCUMENTS

| | | | | |
|---|---|---|---|---|
| 2020/0404282 | A1* | 12/2020 | Li | H04N 19/117 |
| 2021/0058617 | A1* | 2/2021 | Reuze | H04N 19/537 |
| 2022/0239899 | A1* | 7/2022 | Zhang | H04N 19/132 |
| 2023/0247216 | A1* | 8/2023 | Huang | H04N 19/44 |
| | | | | 375/240.15 |

OTHER PUBLICATIONS

Gao et al. Geometric partitioning mode in versatile video coding: Algorithm review and analysis. IEEE Transactions on Circuits and Systems for Video Technology. Nov. 24, 2020;31 (9):3603-17. entire document.
High Efficiency Video Coding, Rec. ITU-T H.265 v4 Dec. 2016, pp. 1-664.
ITU-T and ISO/IEC, "Versatile Video Coding", ITU-T Rec. H.266 and ISO/IEC 23090-3, 2020, pp. 1-516.
Y.-J. Chang, et al., "Compression efficiency methods beyond VVC", ISO/IEC JTC1/SC29/WG11 JVET-U0100, Jan. 2021, pp. 1-13.
V. Seregin, et al., "Exploration Experiment on Enhanced Compression beyond VVC capability", ISO/IEC JTC1/SC29/ WG11 JVET-U2024, Jan. 2021, pp. 1-19.
R.-L. Liao, Y. Ye, X. Li, and J. Chen, "EE2-related: Combination of GPM and template matching", ISO/IEC JTC1/SC29/ WG11 JVET-V0117, Apr. 2021, pp. 1-2.
Y. Kidani, H. Kato, and K. Kawamura, "AHG12: GPM with inter and intra prediction", ISO/IEC JTC1/SC29/WG11 JVET-W0110, Jul. 2021, pp. 1-3.
C.-C. Chen, H. Huang, Y. Zhang, Z. Zhang, Y.-J. Chang, V. Seregin, and M. Karczewicz, "EE2-2.4: Template matching based reordering for GPM split mode", ISO/IEC JTC1/SC29 JVET-Z0056, Apr. 2022, pp. 1-2.
X. Xiu, C.-W. Kuo, X. Wang, R.-L. Liao, Y. Ye, X. Li, J. Chen, Z. Deng, K. Zhang, L. Zhang, N. Zhang, Y. Wang, Y.-J. Chang, H. Huang, V. Seregin, C.-C. Chen, M. Karczewicz, "EE2-related: Combination of EE2-3.3, EE2-3.4 and EE2-3.5," JVET Teleconference, 23rd meeting, document JVET-W0097, Jul. 2021, pp. 1-5.
Y. Kidani, H. Kato, K. Kawamura, H. Jang, S. Kim, J. Lim, Z. Deng, K. Zhang, L. Zhang, "EE2-3.1: GPM with inter and Intra prediction (JVET-X0166)" JVET Teleconference, 25th meeting, document JVET-Y0065, Jan. 2022, pp. 1-5.
Y. Kidani, H. Kato, K. Unno, and K. Kawamurn, "Non-EE2: Adaptive width for GPM blending area", ISO/IEC JTC1/SC29 JVET-Z0059, Apr. 2022, pp. 1-5.
H. Gao, X. Xiu, W. Chen, H.-J. Jhu, C.-W. Kuo, N. Yan, and X. Wang, "Non-EE2: Adaptive blending for GPM", ISO/IEC JTC1/SC29 JVET-Z0137, Apr. 2022, pp. 1-3.

* cited by examiner

ADAPTIVE BLENDING FOR GEOMETRIC PARTITION MODE (GPM)

INCORPORATION BY REFERENCE

The present application claims the benefit of priority to U.S. Provisional Application No. 63/332,741, "ADAPTIVE BLENDING FOR GEOMETRIC PARTITION MODE (GPM)" filed on Apr. 20, 2022, which is incorporated by reference herein in its entirety.

TECHNICAL FIELD

The present disclosure describes embodiments generally related to video coding.

BACKGROUND

The background description provided herein is for the purpose of generally presenting the context of the disclosure. Work of the presently named inventors, to the extent the work is described in this background section, as well as aspects of the description that may not otherwise qualify as prior art at the time of filing, are neither expressly nor impliedly admitted as prior art against the present disclosure.

Image/video compression can help transmit image/video files across different devices, storage, and networks with minimal quality degradation. In some examples, video codec technology can compress video based on spatial and temporal redundancy. In an example, a video codec can use techniques referred to as intra prediction that can compress images based on spatial redundancy. For example, the intra prediction can use reference data from the current picture under reconstruction for sample prediction. In another example, a video codec can use techniques referred to as inter prediction that can compress image based on temporal redundancy. For example, the inter prediction can predict samples in a current picture from previously reconstructed picture with motion compensation. The motion compensation is generally indicated by a motion vector (MV).

SUMMARY

Aspects of the disclosure provide methods and apparatuses for video encoding and decoding. In some examples, an apparatus for video decoding includes and processing circuitry. The processing circuitry receives a video bitstream comprising a current block in a current picture. A value of a syntax element associated with the current block in the current picture is decoded. The syntax element indicates whether the current block is coded with a geometric partition mode (GPM) along a partition edge intersecting the current block. In response to the value of the syntax element indicating that the current block is coded with the GPM and a condition for adaptive blending being satisfied, width candidates in a width candidate list can be reordered using template matching (TM) that is based on a current template of the current block and reference templates that correspond to the respective width candidates. The processing circuitry can select a width candidate from the reordered width candidate list and determine a width of a blending area based on the selected width candidate. The blending area surrounding the partition edge can be defined by boundaries on both sides of the partition edge. The boundaries are parallel to the partition edge, and the width of the blending area is measured perpendicular to the partition edge. The processing circuitry can determine the blending area based on the width of the blending area and reconstruct samples within the blending area in the current block by applying the adaptive blending using the determined blending area.

Aspects of the disclosure also provide a non-transitory computer-readable medium storing instructions which when executed by a computer for video decoding cause the computer to perform the methods for video decoding.

BRIEF DESCRIPTION OF THE DRAWINGS

Further features, the nature, and various advantages of the disclosed subject matter will be more apparent from the following detailed description and the accompanying drawings in which.

DETAILED DESCRIPTION OF EMBODIMENTS

Figure 1:
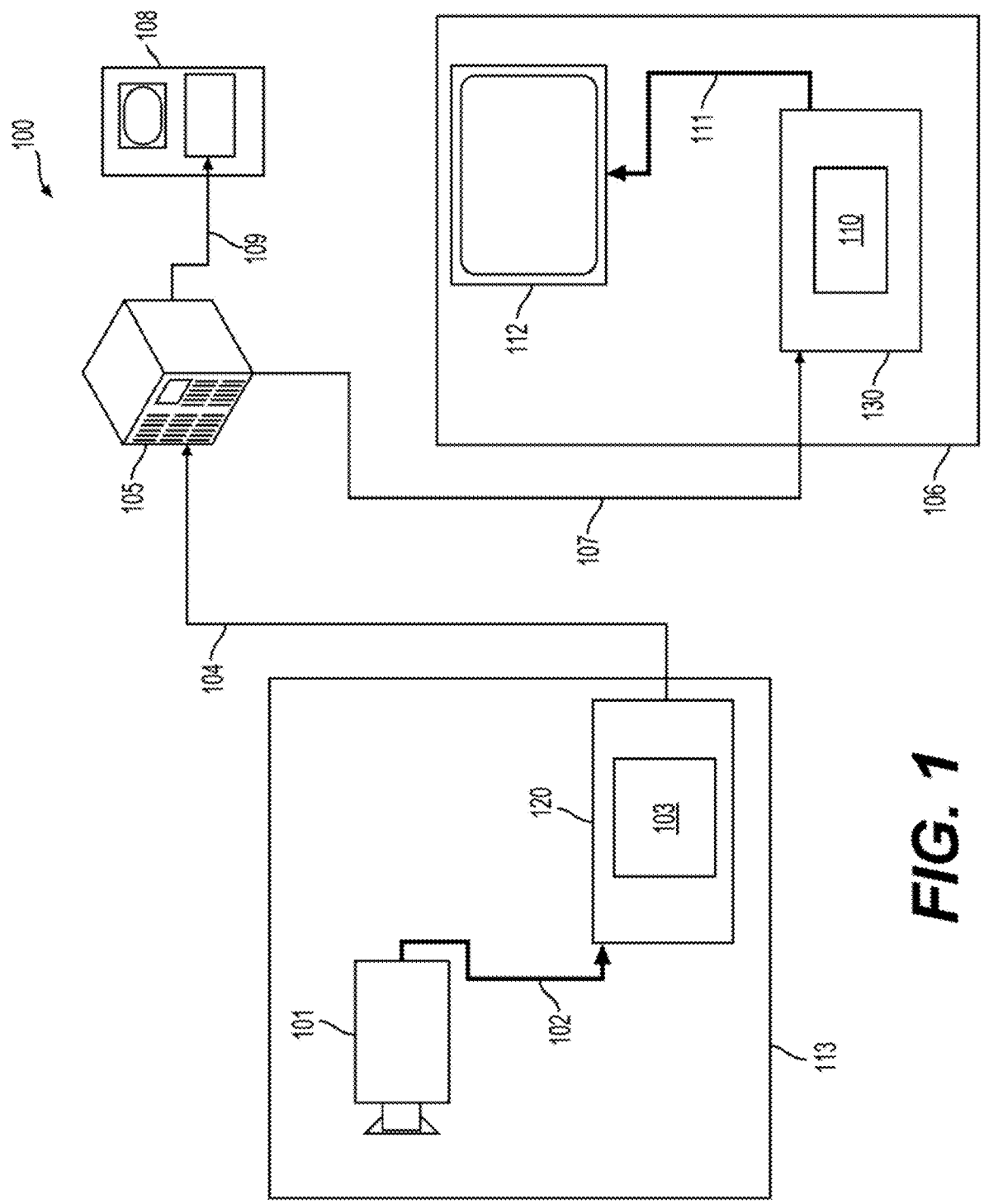
FIG. 1 is a schematic illustration of an exemplary block diagram of a communication system (100).

FIG. 1 shows a block diagram of a video processing system (100) in some examples. The video processing system (100) is an example of an application for the disclosed subject matter, a video encoder and a video decoder in a streaming environment. The disclosed subject matter can be equally applicable to other video enabled applications, including, for example, video conferencing, digital TV, streaming services, storing of compressed video on digital media including CD, DVD, memory stick and the like, and so on.

The video processing system (100) include a capture subsystem (113), that can include a video source (101), for example a digital camera, creating for example a stream of video pictures (102) that are uncompressed. In an example, the stream of video pictures (102) includes samples that are taken by the digital camera. The stream of video pictures (102), depicted as a bold line to emphasize a high data volume when compared to encoded video data (104) (or coded video bitstreams), can be processed by an electronic device (120) that includes a video encoder (103) coupled to the video source (101). The video encoder (103) can include hardware, software, or a combination thereof to enable or implement aspects of the disclosed subject matter as described in more detail below. The encoded video data (104) (or encoded video bitstream), depicted as a thin line to emphasize the lower data volume when compared to the stream of video pictures (102), can be stored on a streaming server (105) for future use. One or more streaming client subsystems, such as client subsystems (106) and (108) in FIG. 1 can access the streaming server (105) to retrieve copies (107) and (109) of the encoded video data (104). A client subsystem (106) can include a video decoder (110), for example, in an electronic device (130). The video decoder (110) decodes the incoming copy (107) of the encoded video data and creates an outgoing stream of video pictures (111) that can be rendered on a display (112) (e.g., display screen) or other rendering device (not depicted). In some streaming systems, the encoded video data (104), (107), and (109) (e.g., video bitstreams) can be encoded according to certain video coding/compression standards. Examples of those standards include ITU-T Recommendation H.265. In an example, a video coding standard under development is informally known as Versatile Video Coding (VVC). The disclosed subject matter may be used in the context of VVC.

It is noted that the electronic devices (120) and (130) can include other components (not shown). For example, the electronic device (120) can include a video decoder (not shown) and the electronic device (130) can include a video encoder (not shown) as well.

Figure 2:
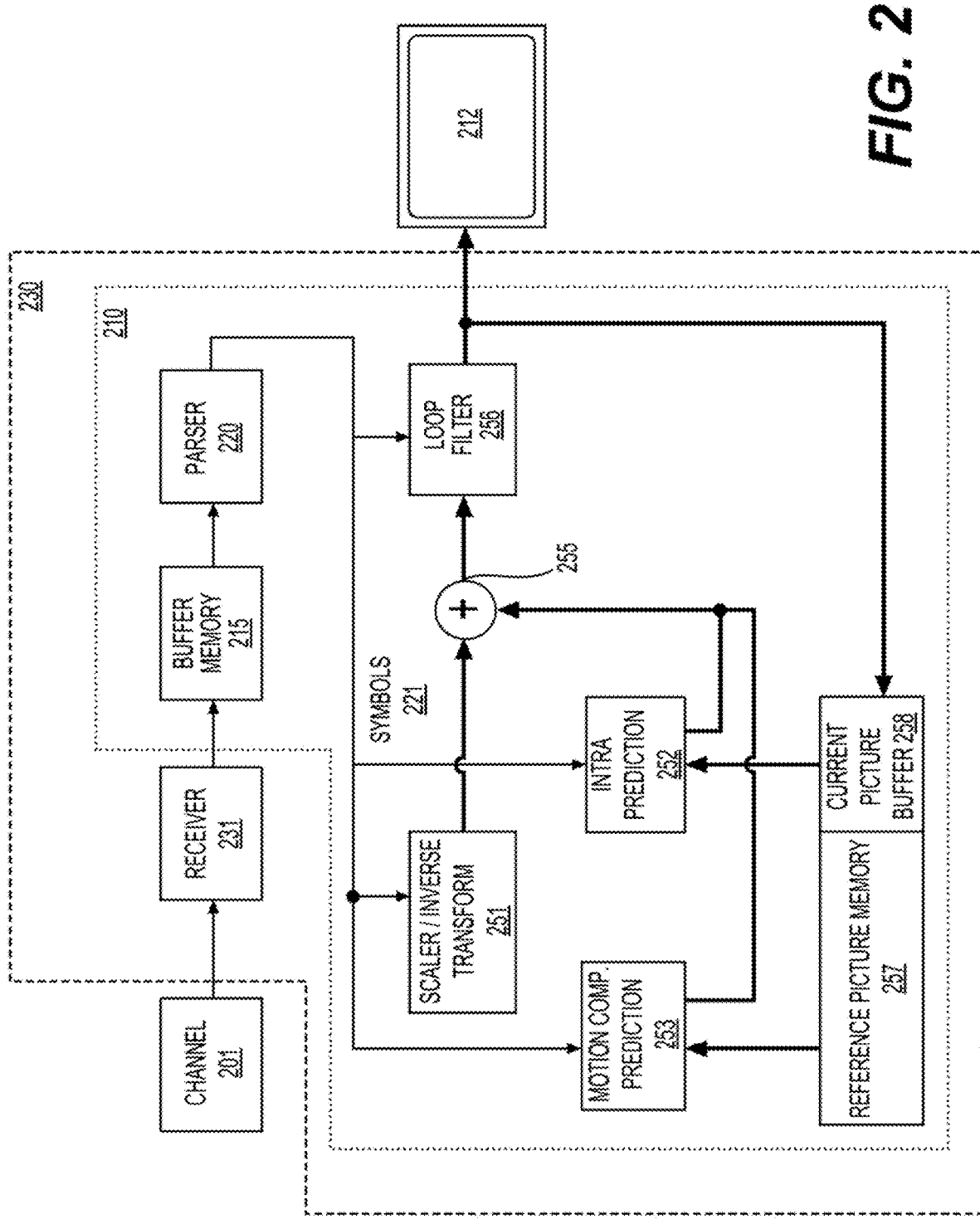
FIG. 2 is a schematic illustration of an exemplary block diagram of a decoder.

FIG. 2 shows an exemplary block diagram of a video decoder (210). The video decoder (210) can be included in an electronic device (230). The electronic device (230) can include a receiver (231) (e.g., receiving circuitry). The video decoder (210) can be used in the place of the video decoder (110) in the FIG. 1 example.

The receiver (231) may receive one or more coded video sequences to be decoded by the video decoder (210). In an embodiment, one coded video sequence is received at a time, where the decoding of each coded video sequence is independent from the decoding of other coded video sequences. The coded video sequence may be received from a channel (201), which may be a hardware/software link to a storage device which stores the encoded video data. The receiver (231) may receive the encoded video data with other data, for example, coded audio data and/or ancillary data streams, that may be forwarded to their respective using entities (not depicted). The receiver (231) may separate the coded video sequence from the other data. To combat network jitter, a buffer memory (215) may be coupled in between the receiver (231) and an entropy decoder/parser (220) ("parser (220)" henceforth). In certain applications, the buffer memory (215) is part of the video decoder (210). In others, it can be outside of the video decoder (210) (not depicted). In still others, there can be a buffer memory (not depicted) outside of the video decoder (210), for example to combat network jitter, and in addition another buffer memory (215) inside the video decoder (210), for example to handle playout timing. When the receiver (231) is receiving data from a store/forward device of sufficient bandwidth and controllability, or from an isosynchronous network, the buffer memory (215) may not be needed, or can be small. For use on best effort packet networks such as the Internet, the buffer memory (215) may be required, can be comparatively large and can be advantageously of adaptive size, and may at least partially be implemented in an operating system or similar elements (not depicted) outside of the video decoder (210).

The video decoder (210) may include the parser (220) to reconstruct symbols (221) from the coded video sequence. Categories of those symbols include information used to manage operation of the video decoder (210), and potentially information to control a rendering device such as a render device (212) (e.g., a display screen) that is not an integral part of the electronic device (230) but can be coupled to the electronic device (230), as shown in FIG. 2. The control information for the rendering device(s) may be in the form of Supplemental Enhancement Information (SEI) messages or Video Usability Information (VUI) parameter set fragments (not depicted). The parser (220) may parse/entropy-decode the coded video sequence that is received. The coding of the coded video sequence can be in accordance with a video coding technology or standard, and can follow various principles, including variable length coding, Huffman coding, arithmetic coding with or without context sensitivity, and so forth. The parser (220) may extract from the coded video sequence, a set of subgroup parameters for at least one of the subgroups of pixels in the video decoder, based upon at least one parameter corresponding to the group. Subgroups can include Groups of Pictures (GOPs), pictures, tiles, slices, macroblocks, Coding Units (CUs), blocks, Transform Units (TUs), Prediction Units (PUs) and so forth. The parser (220) may also extract from the coded video sequence information such as transform coefficients, quantizer parameter values, motion vectors, and so forth.

The parser (220) may perform an entropy decoding/parsing operation on the video sequence received from the buffer memory (215), so as to create symbols (221).

Reconstruction of the symbols (221) can involve multiple different units depending on the type of the coded video picture or parts thereof (such as: inter and intra picture, inter and intra block), and other factors. Which units are involved, and how, can be controlled by subgroup control information parsed from the coded video sequence by the parser (220). The flow of such subgroup control information between the parser (220) and the multiple units below is not depicted for clarity.

Beyond the functional blocks already mentioned, the video decoder (210) can be conceptually subdivided into a number of functional units as described below. In a practical implementation operating under commercial constraints, many of these units interact closely with each other and can, at least partly, be integrated into each other. However, for the purpose of describing the disclosed subject matter, the conceptual subdivision into the functional units below is appropriate.

A first unit is the scaler/inverse transform unit (251). The scaler/inverse transform unit (251) receives a quantized transform coefficient as well as control information, including which transform to use, block size, quantization factor, quantization scaling matrices, etc. as symbol(s) (221) from the parser (220). The scaler/inverse transform unit (251) can output blocks comprising sample values, that can be input into aggregator (255).

In some cases, the output samples of the scaler/inverse transform unit (251) can pertain to an intra coded block. The intra coded block is a block that is not using predictive information from previously reconstructed pictures, but can use predictive information from previously reconstructed parts of the current picture. Such predictive information can be provided by an intra picture prediction unit (252). In some cases, the intra picture prediction unit (252) generates a block of the same size and shape of the block under reconstruction, using surrounding already reconstructed information fetched from the current picture buffer (258). The current picture buffer (258) buffers, for example, partly reconstructed current picture and/or fully reconstructed current picture. The aggregator (255), in some cases, adds, on a per sample basis, the prediction information the intra prediction unit (252) has generated to the output sample information as provided by the scaler/inverse transform unit (251).

In other cases, the output samples of the scaler/inverse transform unit (251) can pertain to an inter coded, and potentially motion compensated, block. In such a case, a motion compensation prediction unit (253) can access reference picture memory (257) to fetch samples used for prediction. After motion compensating the fetched samples in accordance with the symbols (221) pertaining to the block, these samples can be added by the aggregator (255) to the output of the scaler/inverse transform unit (251) (in this case called the residual samples or residual signal) so as to generate output sample information. The addresses within the reference picture memory (257) from where the motion compensation prediction unit (253) fetches prediction samples can be controlled by motion vectors, available to the motion compensation prediction unit (253) in the form of symbols (221) that can have, for example X, Y, and reference picture components. Motion compensation also can include interpolation of sample values as fetched from the reference picture memory (257) when sub-sample exact motion vectors are in use, motion vector prediction mechanisms, and so forth.

The output samples of the aggregator (255) can be subject to various loop filtering techniques in the loop filter unit (256). Video compression technologies can include in-loop filter technologies that are controlled by parameters included in the coded video sequence (also referred to as coded video bitstream) and made available to the loop filter unit (256) as symbols (221) from the parser (220). Video compression can also be responsive to meta-information obtained during the decoding of previous (in decoding order) parts of the coded picture or coded video sequence, as well as responsive to previously reconstructed and loop-filtered sample values.

The output of the loop filter unit (256) can be a sample stream that can be output to the render device (212) as well as stored in the reference picture memory (257) for use in future inter-picture prediction.

Certain coded pictures, once fully reconstructed, can be used as reference pictures for future prediction. For example, once a coded picture corresponding to a current picture is fully reconstructed and the coded picture has been identified as a reference picture (by, for example, the parser (220)), the current picture buffer (258) can become a part of the reference picture memory (257), and a fresh current picture buffer can be reallocated before commencing the reconstruction of the following coded picture.

The video decoder (210) may perform decoding operations according to a predetermined video compression technology or a standard, such as ITU-T Rec. H.265. The coded video sequence may conform to a syntax specified by the video compression technology or standard being used, in the sense that the coded video sequence adheres to both the syntax of the video compression technology or standard and the profiles as documented in the video compression technology or standard. Specifically, a profile can select certain tools as the only tools available for use under that profile from all the tools available in the video compression technology or standard. Also necessary for compliance can be that the complexity of the coded video sequence is within bounds as defined by the level of the video compression technology or standard. In some cases, levels restrict the maximum picture size, maximum frame rate, maximum reconstruction sample rate (measured in, for example megasamples per second), maximum reference picture size, and so on. Limits set by levels can, in some cases, be further restricted through Hypothetical Reference Decoder (HRD) specifications and metadata for HRD buffer management signaled in the coded video sequence.

In an embodiment, the receiver (231) may receive additional (redundant) data with the encoded video. The additional data may be included as part of the coded video sequence(s). The additional data may be used by the video decoder (210) to properly decode the data and/or to more accurately reconstruct the original video data. Additional data can be in the form of, for example, temporal, spatial, or signal noise ratio (SNR) enhancement layers, redundant slices, redundant pictures, forward error correction codes, and so on.

Figure 3:
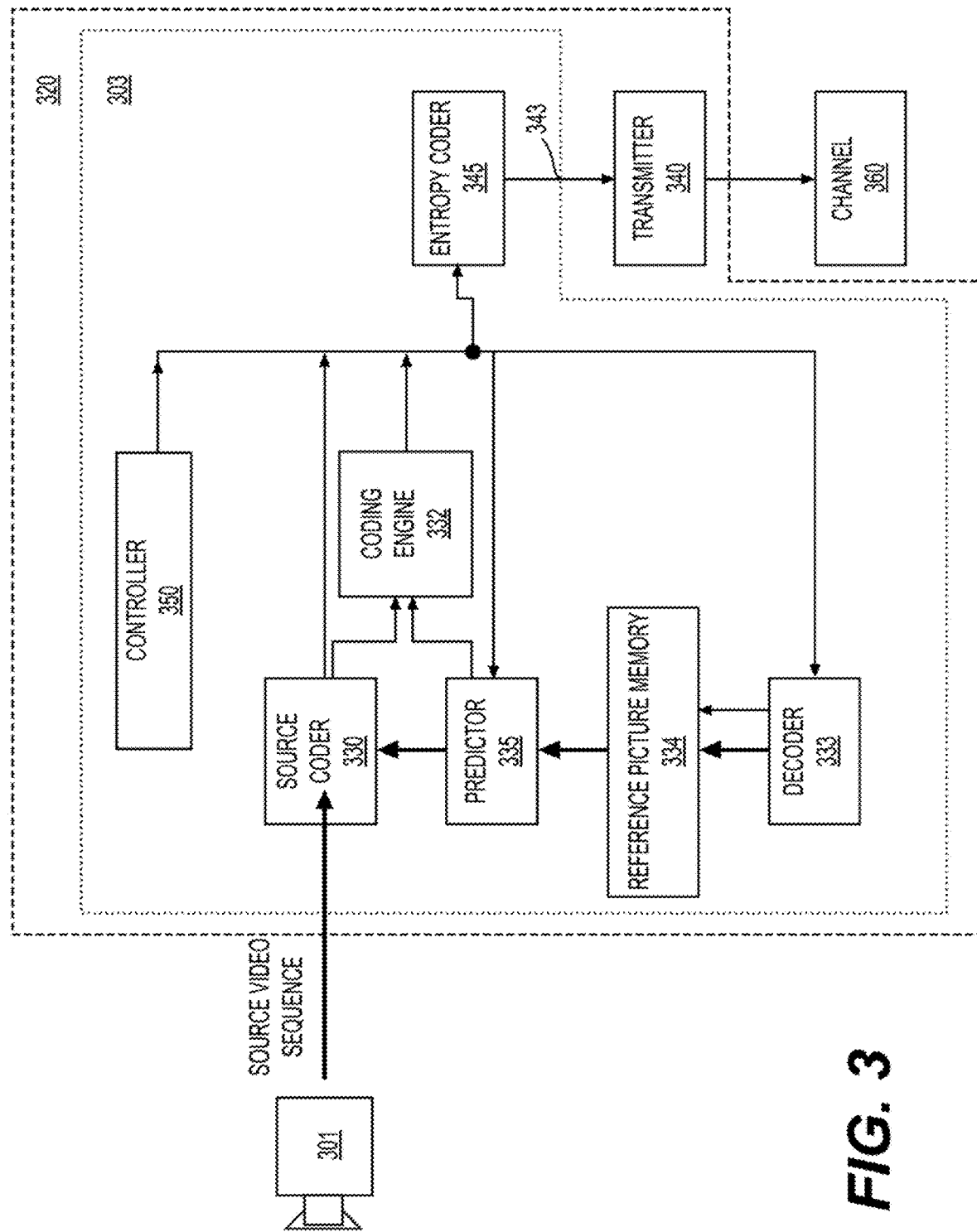
FIG. 3 is a schematic illustration of an exemplary block diagram of an encoder.

FIG. 3 shows an exemplary block diagram of a video encoder (303). The video encoder (303) is included in an electronic device (320). The electronic device (320) includes a transmitter (340) (e.g., transmitting circuitry). The video encoder (303) can be used in the place of the video encoder (103) in the FIG. 1 example.

The video encoder (303) may receive video samples from a video source (301) (that is not part of the electronic device (320) in the FIG. 3 example) that may capture video image(s) to be coded by the video encoder (303). In another example, the video source (301) is a part of the electronic device (320).

The video source (301) may provide the source video sequence to be coded by the video encoder (303) in the form of a digital video sample stream that can be of any suitable bit depth (for example: 8 bit, 10 bit, 12 bit, . . . ), any colorspace (for example, BT.601 Y CrCB, RGB, . . . ), and any suitable sampling structure (for example Y CrCb 4:2:0, Y CrCb 4:4:4). In a media serving system, the video source (301) may be a storage device storing previously prepared video. In a videoconferencing system, the video source (301) may be a camera that captures local image information as a video sequence. Video data may be provided as a plurality of individual pictures that impart motion when viewed in sequence. The pictures themselves may be organized as a spatial array of pixels, wherein each pixel can comprise one or more samples depending on the sampling structure, color space, etc. in use. A person skilled in the art can readily understand the relationship between pixels and samples. The description below focuses on samples.

According to an embodiment, the video encoder (303) may code and compress the pictures of the source video sequence into a coded video sequence (343) in real time or under any other time constraints as required. Enforcing appropriate coding speed is one function of a controller (350). In some embodiments, the controller (350) controls other functional units as described below and is functionally coupled to the other functional units. The coupling is not depicted for clarity. Parameters set by the controller (350) can include rate control related parameters (picture skip, quantizer, lambda value of rate-distortion optimization techniques, . . . ), picture size, group of pictures (GOP) layout, maximum motion vector search range, and so forth. The controller (350) can be configured to have other suitable functions that pertain to the video encoder (303) optimized for a certain system design.

In some embodiments, the video encoder (303) is configured to operate in a coding loop. As an oversimplified description, in an example, the coding loop can include a source coder (330) (e.g., responsible for creating symbols, such as a symbol stream, based on an input picture to be coded, and a reference picture(s)), and a (local) decoder (333) embedded in the video encoder (303). The decoder (333) reconstructs the symbols to create the sample data in a similar manner as a (remote) decoder also would create. The reconstructed sample stream (sample data) is input to the reference picture memory (334). As the decoding of a symbol stream leads to bit-exact results independent of decoder location (local or remote), the content in the reference picture memory (334) is also bit exact between the local encoder and remote encoder. In other words, the prediction part of an encoder "sees" as reference picture samples exactly the same sample values as a decoder would "see" when using prediction during decoding. This fundamental principle of reference picture synchronicity (and resulting drift, if synchronicity cannot be maintained, for example because of channel errors) is used in some related arts as well.

The operation of the "local" decoder (333) can be the same as of a "remote" decoder, such as the video decoder (210), which has already been described in detail above in conjunction with FIG. 2. Briefly referring also to FIG. 2, however, as symbols are available and encoding/decoding of symbols to a coded video sequence by an entropy coder (345) and the parser (220) can be lossless, the entropy decoding parts of the video decoder (210), including the buffer memory (215), and parser (220) may not be fully implemented in the local decoder (333).

In an embodiment, a decoder technology except the parsing/entropy decoding that is present in a decoder is present, in an identical or a substantially identical functional form, in a corresponding encoder. Accordingly, the disclosed subject matter focuses on decoder operation. The description of encoder technologies can be abbreviated as they are the inverse of the comprehensively described decoder technologies. In certain areas a more detail description is provided below.

During operation, in some examples, the source coder (330) may perform motion compensated predictive coding, which codes an input picture predictively with reference to one or more previously coded picture from the video sequence that were designated as "reference pictures." In this manner, the coding engine (332) codes differences between pixel blocks of an input picture and pixel blocks of reference picture(s) that may be selected as prediction reference(s) to the input picture.

The local video decoder (333) may decode coded video data of pictures that may be designated as reference pictures, based on symbols created by the source coder (330). Operations of the coding engine (332) may advantageously be lossy processes. When the coded video data may be decoded at a video decoder (not shown in FIG. 3), the reconstructed video sequence typically may be a replica of the source video sequence with some errors. The local video decoder (333) replicates decoding processes that may be performed by the video decoder on reference pictures and may cause reconstructed reference pictures to be stored in the reference picture memory (334). In this manner, the video encoder (303) may store copies of reconstructed reference pictures locally that have common content as the reconstructed reference pictures that will be obtained by a far-end video decoder (absent transmission errors).

The predictor (335) may perform prediction searches for the coding engine (332). That is, for a new picture to be coded, the predictor (335) may search the reference picture memory (334) for sample data (as candidate reference pixel blocks) or certain metadata such as reference picture motion vectors, block shapes, and so on, that may serve as an appropriate prediction reference for the new pictures. The predictor (335) may operate on a sample block-by-pixel block basis to find appropriate prediction references. In some cases, as determined by search results obtained by the predictor (335), an input picture may have prediction references drawn from multiple reference pictures stored in the reference picture memory (334).

The controller (350) may manage coding operations of the source coder (330), including, for example, setting of parameters and subgroup parameters used for encoding the video data.

Output of all aforementioned functional units may be subjected to entropy coding in the entropy coder (345). The entropy coder (345) translates the symbols as generated by the various functional units into a coded video sequence, by applying lossless compression to the symbols according to technologies such as Huffman coding, variable length coding, arithmetic coding, and so forth.

The transmitter (340) may buffer the coded video sequence(s) as created by the entropy coder (345) to prepare for transmission via a communication channel (360), which may be a hardware/software link to a storage device which would store the encoded video data. The transmitter (340) may merge coded video data from the video encoder (303) with other data to be transmitted, for example, coded audio data and/or ancillary data streams (sources not shown).

The controller (350) may manage operation of the video encoder (303). During coding, the controller (350) may assign to each coded picture a certain coded picture type, which may affect the coding techniques that may be applied to the respective picture. For example, pictures often may be assigned as one of the following picture types:

An Intra Picture (I picture) may be one that may be coded and decoded without using any other picture in the sequence as a source of prediction. Some video codecs allow for different types of intra pictures, including, for example Independent Decoder Refresh ("IDR") Pictures. A person skilled in the art is aware of those variants of I pictures and their respective applications and features.

A predictive picture (P picture) may be one that may be coded and decoded using intra prediction or inter prediction using at most one motion vector and reference index to predict the sample values of each block.

A bi-directionally predictive picture (B Picture) may be one that may be coded and decoded using intra prediction or inter prediction using at most two motion vectors and reference indices to predict the sample values of each block. Similarly, multiple-predictive pictures can use more than two reference pictures and associated metadata for the reconstruction of a single block.

Source pictures commonly may be subdivided spatially into a plurality of sample blocks (for example, blocks of 4×4, 8×8, 4×8, or 16×16 samples each) and coded on a block-by-block basis. Blocks may be coded predictively with reference to other (already coded) blocks as determined by the coding assignment applied to the blocks' respective pictures. For example, blocks of I pictures may be coded non-predictively or they may be coded predictively with reference to already coded blocks of the same picture (spatial prediction or intra prediction). Pixel blocks of P pictures may be coded predictively, via spatial prediction or via temporal prediction with reference to one previously coded reference picture. Blocks of B pictures may be coded predictively, via spatial prediction or via temporal prediction with reference to one or two previously coded reference pictures.

The video encoder (303) may perform coding operations according to a predetermined video coding technology or standard, such as ITU-T Rec. H.265. In its operation, the video encoder (303) may perform various compression operations, including predictive coding operations that exploit temporal and spatial redundancies in the input video sequence. The coded video data, therefore, may conform to a syntax specified by the video coding technology or standard being used.

In an embodiment, the transmitter (340) may transmit additional data with the encoded video. The source coder (330) may include such data as part of the coded video sequence. Additional data may comprise temporal/spatial/SNR enhancement layers, other forms of redundant data such as redundant pictures and slices, SEI messages, VUI parameter set fragments, and so on.

A video may be captured as a plurality of source pictures (video pictures) in a temporal sequence. Intra-picture prediction (often abbreviated to intra prediction) makes use of spatial correlation in a given picture, and inter-picture prediction makes uses of the (temporal or other) correlation between the pictures. In an example, a specific picture under encoding/decoding, which is referred to as a current picture, is partitioned into blocks. When a block in the current picture is similar to a reference block in a previously coded and still buffered reference picture in the video, the block in the current picture can be coded by a vector that is referred to as a motion vector. The motion vector points to the reference block in the reference picture, and can have a third dimension identifying the reference picture, in case multiple reference pictures are in use.

In some embodiments, a bi-prediction technique can be used in the inter-picture prediction. According to the bi-prediction technique, two reference pictures, such as a first reference picture and a second reference picture that are both prior in decoding order to the current picture in the video (but may be in the past and future, respectively, in display order) are used. A block in the current picture can be coded by a first motion vector that points to a first reference block in the first reference picture, and a second motion vector that points to a second reference block in the second reference picture. The block can be predicted by a combination of the first reference block and the second reference block.

Further, a merge mode technique can be used in the inter-picture prediction to improve coding efficiency.

According to some embodiments of the disclosure, predictions, such as inter-picture predictions and intra-picture predictions, are performed in the unit of blocks. For example, according to the HEVC standard, a picture in a sequence of video pictures is partitioned into coding tree units (CTU) for compression, the CTUs in a picture have the same size, such as 64×64 pixels, 32×32 pixels, or 16×16 pixels. In general, a CTU includes three coding tree blocks (CTBs), which are one luma CTB and two chroma CTBs. Each CTU can be recursively quadtree split into one or multiple coding units (CUs). For example, a CTU of 64×64 pixels can be split into one CU of 64×64 pixels, or 4 CUs of 32×32 pixels, or 16 CUs of 16×16 pixels. In an example, each CU is analyzed to determine a prediction type for the CU, such as an inter prediction type or an intra prediction type. The CU is split into one or more prediction units (PUs) depending on the temporal and/or spatial predictability. Generally, each PU includes a luma prediction block (PB), and two chroma PBs. In an embodiment, a prediction operation in coding (encoding/decoding) is performed in the unit of a prediction block. Using a luma prediction block as an example of a prediction block, the prediction block includes a matrix of values (e.g., luma values) for pixels, such as 8×8 pixels, 16×16 pixels, 8×16 pixels, 16×8 pixels, and the like.

It is noted that the video encoders (103) and (303), and the video decoders (110) and (210) can be implemented using any suitable technique. In an embodiment, the video encoders (103) and (303) and the video decoders (110) and (210) can be implemented using one or more integrated circuits. In another embodiment, the video encoders (103) and (303), and the video decoders (110) and (210) can be implemented using one or more processors that execute software instructions.

Various inter prediction modes can be used in VVC. For an inter-predicted CU, motion parameters can include MV(s), one or more reference picture indices, a reference picture list usage index, and additional information for certain coding features to be used for inter-predicted sample generation. A motion parameter can be signaled explicitly or implicitly. When a CU is coded with a skip mode, the CU can be associated with a PU and can have no significant residual coefficients, no coded motion vector delta or MV difference (e.g., MVD) or a reference picture index. A merge mode can be specified where the motion parameters for the current CU are obtained from neighboring CU(s), including spatial and/or temporal candidates, and optionally additional information such as introduced in VVC. The merge mode can be applied to an inter-predicted CU, not only for skip mode. In an example, an alternative to the merge mode is the explicit transmission of motion parameters, where MV(s), a corresponding reference picture index for each reference picture list and a reference picture list usage flag and other information are signaled explicitly per CU.

In an embodiment (e.g., in VVC), VVC Test model (VTM) reference software includes one or more refined inter prediction coding tools that include: an extended merge prediction, a merge motion vector difference (MMVD) mode, an adaptive motion vector prediction (AMVP) mode with symmetric MVD signaling, an affine motion compensated prediction, a subblock-based temporal motion vector prediction (SbTMVP), a combined inter and intra prediction (CIIP), a geometric partitioning mode (GPM), and the like. Inter predictions and related methods are described in details below.

A geometric partition mode (GPM) can be used for inter prediction, such as in VVC. In an example, the GPM is only applied to CUs that are 8×8 or larger. The GPM can be signaled using a CU-level flag as a type of a merge mode, with other merge modes including a regular merge mode, an MMVD mode, a CIIP mode and a subblock merge mode.

When the GPM is used, a CU can be split into two geometric-shaped partitions (also referred to as a geometric partition or a partition) by using one of a predefined number (e.g., 64) of different partitioning manners or GPM split modes. A geometric partition index (or a GPM split mode index) can be used to indicate a partitioning manner or a GPM split mode, such as one out of the 64 different partitioning manners. In an example, a CU is split evenly into two geometric-shaped partitions. The different partitioning manners can be differentiated by a predefined number (e.g., 24) of angles (e.g., non-uniformed quantized between 0 and 360°) and up to a predefined number (e.g., 4) of partition edges relative to a center of the CU, such as shown in FIGS. 4A-4B.

Figure 4A:
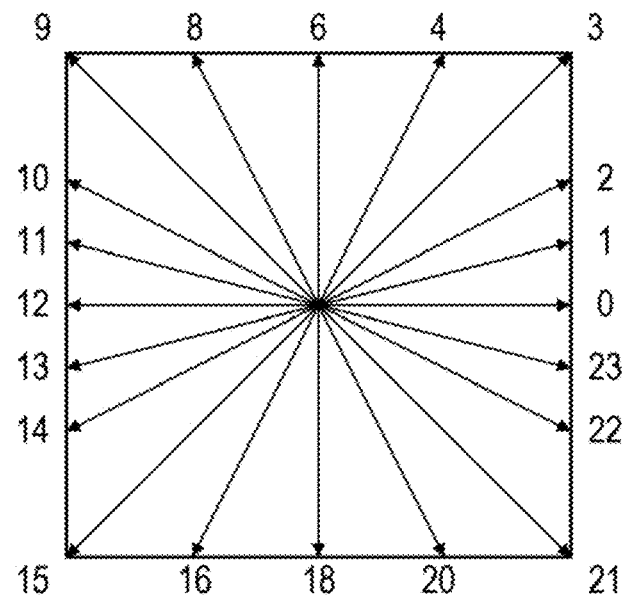
FIG. 4A shows a predefined number of angles distributed from 0° to 360° for a geometric partition mode (GPM) according to an embodiment of the disclosure.
Figure 4B:
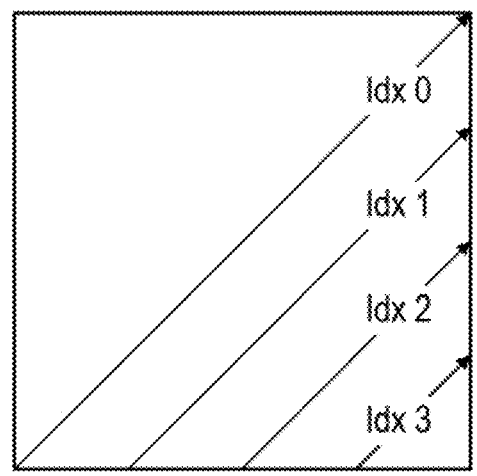
FIG. 4B shows multiple partition edges corresponding to an angle for a GPM according to an embodiment of the disclosure.

FIG. 4A shows a predefined number of angles (or multiple angles) distributed from 0° to 360°, such as 24 supported angles in VVC, according to an embodiment of the disclosure. The multiple angles can be indicated by respective angle indices 0-23. FIG. 4B shows multiple partition edges (e.g., 4 partition edges indicated by respective indices (idx) 0-3) corresponding to one of the multiple angles, such as supported possible partition edges for the angle index 3, according to an embodiment of the disclosure. A set of GPM split modes that is available to code a block can be based on a suitable combination of the multiple angles and the associated partition edge(s) shown in FIGS. 4A-4B.

In an embodiment, each geometric partition in the CU is inter-predicted using respective motion information. In an example, only uni-prediction is allowed for each partition, for example, each partition has a respective MV and a respective reference index. The uni-prediction motion constraint can be applied to ensure that only two motion compensated predictions are used for each CU which is the same when a bi-prediction is applied to the entire CU. In some examples, bi-prediction is applied to a partition in the CU.

In an embodiment, inter prediction is used for the geometric partitions in the CU. In an embodiment, inter prediction and another prediction (e.g., intra prediction) are used for the geometric partitions in the CU.

If the GPM is used for a CU, information indicating a geometric partition index for the CU and prediction information of two geometric partitions in the CU can be signaled. In an example, the prediction information includes two merge indices if each geometric partition in the CU is inter-predicted. The prediction information can include a merge index and an index indicating an intra prediction mode if inter prediction and intra prediction are used for the geometric partitions in the CU.

A number of maximum GPM candidate size can be signaled explicitly, for example, at a slice level and can specify syntax binarization for GPM merge indices.

After predicting each of the two geometric partitions, sample values in a blending region (including samples along the partition edge) can be adjusted using a blending process (or a GPM blending process) with adaptive weights. A size of the blending region can be indicated by a blending strength or a blending area width θ (also referred to as τ in some examples) shown in FIG. 4C. The blending area width θ can be a width of the blending area measured perpendicular to the partition edge (452).

Figure 6:
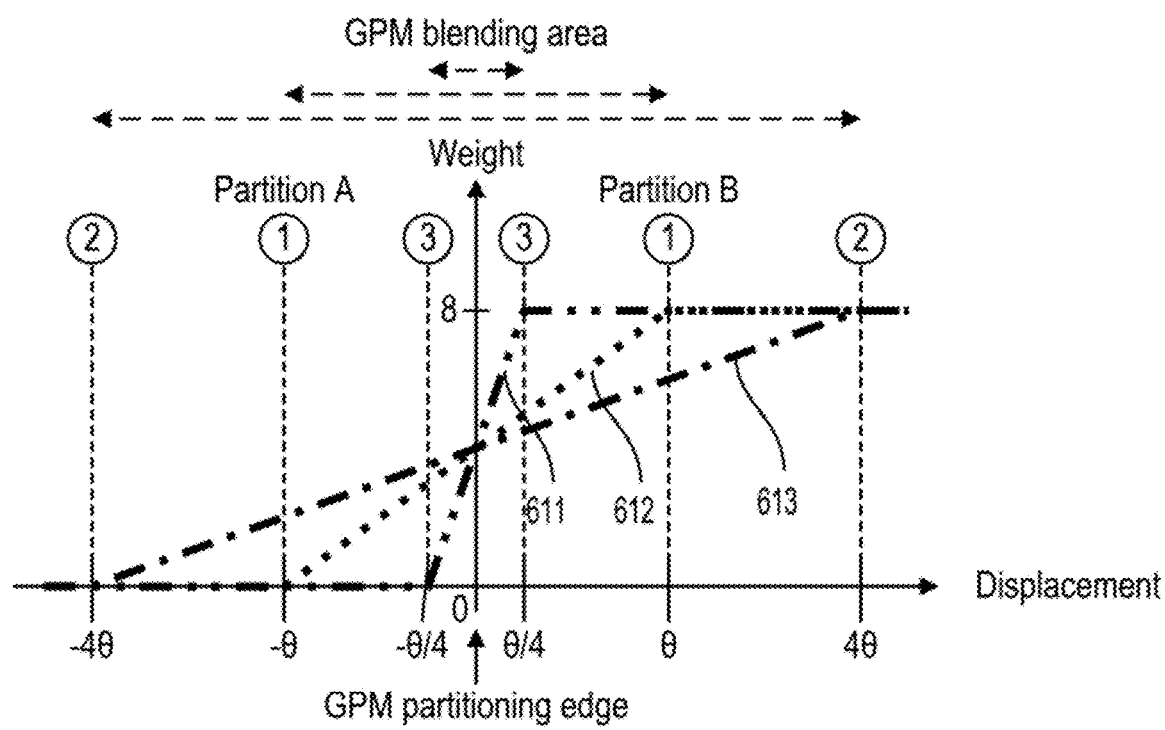
FIG. 6 shows relationships between a weight $\omega_{x_c,y_c}$ and a displacement $d_{x_c,y_c}$ under different blending area sizes according to an embodiment.

In an embodiment, the blending area width θ is fixed for CUs having different contents, such as natural contents, screen contents, a mixture of natural content(s) and screen content(s), and the like. In an embodiment, the blending area width θ is adaptive, for example, is selected from a predefined width candidate list, such as shown in FIG. 6.

Figure 4C:
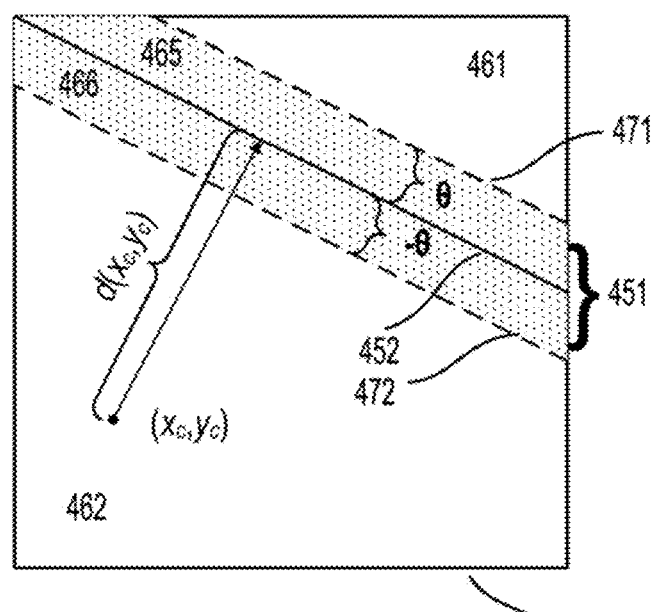
FIG. 4C shows an exemplary GPM blending process applied to a current block according to an embodiment of the disclosure.

FIG. 4C shows an exemplary GPM blending process applied to a CU (450) according to an embodiment of the disclosure. The CU (450) can be partitioned into geometric partitions (461)-(462) by a partition edge (452). In an example, a first prediction mode and a second prediction mode are applied to predict samples in the CU (450) as P0 and P1, respectively. The first prediction mode and the second prediction mode can include suitable prediction mode(s), such as inter prediction mode(s), an intra prediction mode, an intra block copy (IBC) mode, and/or the like.

The partition edge (452) can be oriented at an angle that corresponds to an angle index (e.g., the angle index 10 or 22 in FIG. 4A). The partition edge (452) and the angle index can correspond to a geometric partition index of the CU (450).

A blending region or a blending area (451) can include samples along the partition edge (452). The blending region (451) can include samples that are within a distance (or the blending area width) θ from the partition edge (452). Boundaries (471)-(472) of the blending region (451) are parallel to the partition edge (452) and are separated from the partition edge (452) by the distance θ. In an example, the blending region (451) include a first blending region (465) and a second blending region (466) that are separated by the partition edge (452). The first blending region (465) can be within the partitions (461) and the second blending region (466) can be within the partition (462).

A sample in the CU (450) can be determined based on the blending process, for example, as a weighted sum P.

$$P = (-W) \times P1 + W \times P0 \qquad \text{Eq. 1}$$

P0 and P1 can represent prediction values of the sample based on the first prediction mode and the second prediction mode, respectively. A weight (W) can be determined for the sample in the CU (450) based on a displacement $d(x_c, y_c)$ of the sample in the CU (450) from the partition edge (452).

A blending mask can be applied to the CU (450), and weights (or weighing values) $w_{x_c, y_c}$ in the blending mask can be given by a ramp function below. In an example, W is $\omega_{x_c, y_c}/8$.

$$\omega_{x_c, y_c} = \begin{cases} 0 & d(x_c, y_c) \leq -\theta \\ \frac{8}{20}(d(x_c, y_c) + \theta) & -\theta < d(x_c, y_c) < \theta \\ 8 & d(x_c, y_c) \geq \theta. \end{cases} \qquad \text{Eq. 2}$$

When the sample $(x_c, y_c)$ is located in the partition (462) and outside the second blending region (466), the displacement $d(x_c, y_c)$ is less than or equal to $-\theta$, and $\omega_{x_c, y_c}$ and W is 0. Accordingly, the samples in the partition (462) that are outside the blending region (451) can be predicted as P1 based on the second prediction mode.

When the sample $(x_c, y_c)$ is located in the partition (461) and outside the first blending region (465), the displacement $d(x_c, y_c)$ is larger than or equal to $\theta$, and $\omega_{x_c, y_c}$ is 8 and W is 1. Accordingly, the samples in the partition (461) that are outside the blending region (451) can be predicted as P0 based on the first prediction mode. In an example, no blending is used for the samples that are outside the blending region (451).

When the sample $(x_c, y_c)$ is located in the blending region (451), the displacement $d(x_c, y_c)$ is between $-\theta$ and $\theta$, and $\omega_{x_c, y_c}$ is determined based on the displacement $d(x_c, y_c)$, such as shown in Eq. 2. The samples in the blending region (451) can be predicted as the weighted sum of P0 and P1 as described in Eq. 1.

In an example, θ is fixed as 2 pixels (pel), such as in the current VVC design, the ramp function $\omega_{x_c,y_c}$ can be quantized as $\omega_{m,n}$ $$\omega_{m,n}=\text{Clip3}(0,8,(d(m,n)+32+4)>>3) \quad \text{Eq. 3}$$

In an example, d (m, n) is 16×d($x_c,y_c$).

The blended results P (e.g., the predicted sample values the CU (450)) can include the prediction signal for the CU (450) (e.g., the entire CU (450)). A transform process and a quantization process can be applied to the CU (450) as in other prediction modes. The motion field of the CU (450) predicted using the GPM can be stored.

GPM can be used, for example, beyond VVC. Template matching (TM) which refines the motion at a decoder side can be used, for example, to improve the compression efficiency. In the TM mode, the motion can be refined by constructing a template from left neighboring reconstructed samples and above neighboring reconstructed samples and finding the closest matching between the template in a current picture and a template in reference picture(s) (or reference frame(s)).

In an example, the TM mode can be applied to the GPM. When a CU is coded in the GPM, each motion for the geometric partition can decide whether to be refined using the TM or not. When the TM is chosen, a template can be constructed using left neighboring samples and above neighboring samples, and then the motion can be refined by finding the best matching between the current template and a reference area with a same template pattern in the reference frame. The refined motion can be used to perform motion compensation for the geometric partition and is stored in the motion field.

Template matching (TM) based reordering can be applied to GPM split modes. GPM split mode indices can be reordered by using TM costs, for example, to reduce a signaling cost of a GPM split mode index. The reordering method for the GPM split modes can include a two-step process performed after respective reference templates of two GPM partitions in a CU are generated, such as described below.

Reference templates of the two GPM partitions corresponding to the respective GPM split mode can be blended using respective weights (e.g., W being 0 or 1), and thus obtaining a reference template (or a blended reference template) corresponding to the respective GPM split mode. The predefined number (e.g., 64) of blended reference templates can be determined for the respective GPM split modes, and TM cost values (or TM costs) for the respective blended reference templates can be determined (e.g., computed).

The GPM split modes can be reordered based on the respective TM cost values, for example, in an ascending order. In an example, the TM cost values of the respective M1 (e.g., 64) GPM split modes are calculated, and the best M2 (e.g., 32) GPM split modes (e.g., the 32 GPM split modes having the smallest TM cost values) are marked as available GPM split modes, from which a GPM split mode can be selected for a CU.

After reordering the GPM split modes based on the TM costs, an index can be signaled to indicate the GPM split mode that is selected from the reordered GPM split modes (e.g., the 32 GPM split modes having the smallest TM cost values) to predict the CU. In an example, the index is coded with a Golomb-Rice code (with divisor 4).

Figure 5A:
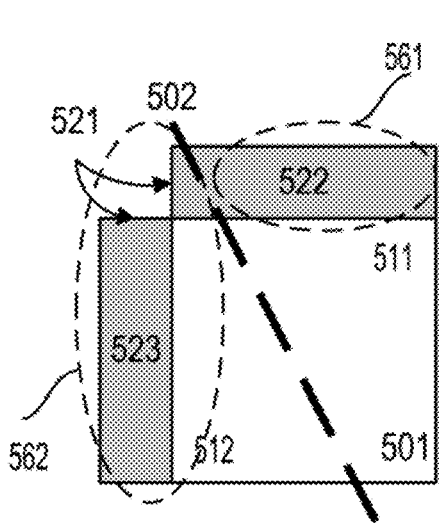
FIG. 5A shows a partition edge of a GPM split mode applied to a current block according to an embodiment of the disclosure.
Figure 5B:
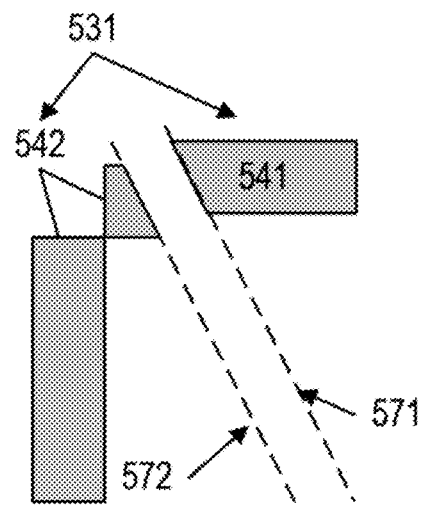
FIG. 5B shows a GPM blending process applied to obtain a reference template according to an embodiment of the disclosure.

Corresponding weights used to obtain the blended reference templates in the blending process can be computed using a similar GPM weight derivation process, such as described in Eqs. 1-3, except that weights $\omega_{x_c,y_c}$ are mapped to two values, such as 0 and 8 (corresponding to W being 0 or 1), depending on a displacement of the respective reference samples from the partition edge, such as described in FIGS. 5A-5B.

FIG. 5A shows a partition edge (502) of a GPM split mode applied to a current block (501) according to an embodiment of the disclosure. The partition edge (502) can divide the current block (501) into partitions or GPM partitions (511) and (512). The partition edge (502) can be extended into a current template (521) of the current block (501). The current template (521) can include a top template (522) and a left template (523). The partition edge (502) can divide the current template (521) into a first template (561) that is on one side (e.g., to the right) of the partition edge (502) and a second template (562) that is on another side (e.g., to the left) of the partition edge (502).

FIG. 5B shows the blending process applied to obtain a reference template (or a blended reference template) (531) corresponding to the current template (521) in FIG. 5A according to an embodiment of the disclosure. In an example, the blending process in FIG. 5B is identical to the blending process in FIG. 4C except that a blending area width θ in FIG. 5B is 0. The reference template (531) can include a first reference template (541) that corresponds to the first template (561) and a second reference template (542) that corresponds to the second template (562). Boundaries (571)-(572) of the first reference template (541) and the second reference template (542) are parallel to the partition edge (502). In an example, the first reference template (541) can be determined based on the first template (561) using the first prediction mode, and the second reference template (542) is determined based on the second template (562) using the second prediction mode. In an example, a sample in the first reference template (541) is predicted as (1−W)× P1+W×P0 with W being 1 (e.g., $\omega_{x_c,y_c}$ is mapped to 8), and a sample in the second reference template (542) is predicted as (1−W)×P1+W×P0 with W being 0 (e.g., $\omega_{x_c,y_c}$ is mapped to 0). In the example shown in FIG. 5B, the first prediction mode and the second prediction mode are inter predictions having two different MVs (e.g., a first MV and a second MV). In an example, the first MV is associated with a first reference picture, and the second MV is associated with a second reference picture. The first reference picture and the second reference picture can be identical or different. The reference template (531) can be predicted similarly if intra prediction or the IBC mode is used as one of the first prediction mode and the second prediction mode. After the reference template (531) is determined, a TM cost corresponding to the GPM split mode is determined. The GPM split modes can be reordered based on the determined TM costs. A GPM split mode to be applied to the current block (501) can be selected based on the reordered GPM split mode.

The GPM can be applied with the TM. The GPM can be applied with the MMVD. The GPM can be applied with inter prediction and intra prediction. In some examples, the blending weight (e.g., $\omega_{x_c,y_c}$ or W) derivation such as described in FIG. 4C and Eqs. 1-3 may not be optimal for different types of contents (e.g., natural contents and screen contents) because a fixed blending area with a fixed θ is used to blend two different partitions. In an example, a screen content video includes strong textures and sharp edges, and a narrow blending area (e.g., with a relatively small θ) may be preferred to reserve edge information in the screen content video.

Adaptive blending can be applied to the GPM. Two different adaptive blending methods can be used. The two different adaptive blending methods can be different in signaling of the blending area width θ. A series of blending area sizes (or predefined blending area width candidates or predefined width candidates) from which a GPM blending area can be selected can be used in the two different adaptive blending methods. The series of blending area sizes can include multiple blending area sizes, such as {θ1, θ2, θ3}. In an example, θ1=θ/4, θ2=θ, and θ3=4θ.

FIG. 6 shows relationships between a weight $\omega_{x_c,y_c}$ and a displacement $d_{x_c,y_c}$ under different blending area sizes according to an embodiment. In an example, Eq. 2 describes the relationships between the weight $\omega_{x_c,y_c}$ and the displacement $d_{x_c,y_c}$ under different blending area sizes.

Referring to FIGS. 4C and 6, a CU (e.g., (450)) can be divided into a partition A (e.g., (462)) and a partition B (e.g., (461)). The blending area size can be selected from θ/4, θ, and 4θ. When the blending area size is θ, a GPM blending area can be from −θ to +θ. The relationship or the ramp function between the weight $\omega_{x_c,y_c}$ and the displacement $d_{x_c,y_c}$ can be indicated by a curve (612). When the blending area size is θ/4, a GPM blending area can be from −θ/4 to +θ/4. The relationship between the weight $\omega_{x_c,y_c}$ and the displacement $d_{x_c,y_c}$ can be indicated by a curve (611). When the blending area size is 4θ, a GPM blending area can be from −4θ to +4θ. The relationship between the weight $\omega_{x_c,y_c}$ and the displacement $d_{x_c,y_c}$ can be indicated by a curve (613). The curves (611)-(613) can represent the ramp functions under the different blending area sizes.

Referring to FIG. 6 and Eq. 2, a maximum value of the weight ($\omega_{max}$) is 8. Slopes of the curves (611)-(613) within the respective GPM blending areas can depend on the maximum value of the weight $\omega_{max}$, for example, the slopes of the curves (611)-(613) within the respective GPM blending areas increases (e.g., linearly) with maximum value of the weight. The slopes of the curves (611)-(613) within the respective GPM blending areas can be 16/θ, 4/θ, and 1/θ corresponding to the blending area sizes of θ/4, θ, and 4θ, respectively. In an example, θ=2, the slopes of the curves (611)-(613) within the respective GPM blending areas can be 8, 2, and ½ corresponding to the blending area sizes of ½, 2, and 4, respectively.

In an adaptive blending method, selectable widths or blending area sizes can be restricted based on a current block size to maximize the coding performance. In an example, when a shorter side of the current block is equal to or smaller than 16 samples, only two narrower widths, such as (θ, θ/4) (or (τ, τ/4)), can be selected. Otherwise, when the shorter side of the current block is larger than 16 samples, only two wider widths, such as (θ, 4θ) (or (τ, 4τ)), can be selected.

In another adaptive blending method, up to N (e.g., 5) different blending weight areas, such as {θ1, θ2, θ3, θ4, θ5}, can be selected. In an example, the blending weight selection is not restricted. In an example, the blending weight areas include {½, 1, 2, 4, 8} or {0, 1, 2, 4, 8}. In order to accommodate an increased width of the GPM blending area (e.g., a blending area width θ is increased from 2 to 8), a maximum value of the weight can be changed from 8 in Eq. 2 to 32 in Eq. 3. Thus, the ramp function in Eq. 2 can become the ramp function described in Eq. 4.

$$\omega_{x_c,y_c} = \begin{cases} 0 & d(x_c, y_c) \leq -\theta \\ \frac{32}{2\theta}(d(x_c, y_c) + \theta) & -\theta < d(x_c, y_c) < \theta \\ 32 & d(x_c, y_c) \geq \theta \end{cases} \quad \text{Eq. 4}$$

In an example, the ramp function $\omega_{x_c,y_c}$ in Eq. 4 can be quantized as $\omega_{m,n}$ described in Eq. 5.

$$\omega_{m,n} = \begin{cases} \text{Clip3}(0, 32, (d(m, n) + 16\theta + (\theta \gg 1)) \gg \log_2\theta), \theta \neq 0 \\ d(m, n) > 0 ? 32:0, \theta = 0 \end{cases} \quad \text{Eq. 5}$$

In an example, d (m, n) is 16×d($x_c$,$y_c$). A weight index (e.g., weightIdx) can be defined as below.

$$\text{weightIdx}_{x_c,y_c} = d(m,n) + 16\theta \quad \text{Eq. 6}$$

The size (e.g., a width) θ of the blending area can be selected from a set of predefined values, such as {½, 1, 2, 4, 8} or {0, 1, 2, 4, 8}.

As described above, predefined values (e.g., predefined blending area width candidate or predefined width candidates), such as {½, 1, 2, 4, 8} or {0, 1, 2, 4, 8}, can be used for adaptive blending areas. An index can be signaled, for example, at a CU level to indicate which blend function or which blending area θ (e.g., which predefined width candidate) is selected. When a number of the predefined width candidates is relatively large or when the index is relatively large, such as 5, signaling of the index may not be efficient.

According to an embodiment of the disclosure, an adaptive blending process with TM can be applied to reorder predefined width candidates (e.g., {θ1, θ2, θ3, θ4, θ5}) in a width candidate list, and a width of the blending area for a current block coded with a GPM can be determined based on the reordered width candidate list. Samples within a blending area in the current block can be reconstructed based on the width of the blending area, such as described in FIG. 4C.

In an embodiment, the current block is coded with the GPM along a partition edge dividing the current block. The samples within the blending area or the GPM blending area that surround the partition edge can be reconstructed based on a blending process, such as described in FIG. 4C. The blending area can be defined by boundaries on both sides of the partition edge, and the boundaries are parallel to the partition edge. The width of the blending area is perpendicular to the partition edge and can be based on the width candidate list including the predefined width candidates, such as {θ1, θ2, θ3, θ4, θ5}. According to an embodiment of the disclosure, when an adaptive blending condition is satisfied, the adaptive blending process using TM can be applied to reorder the width candidates (e.g., {θ1, θ2, θ3, θ4, θ5}) in the width candidate list, and the width of the blending area can be determined based on the reordered width candidate list to reconstruct the current block. For example, the width of the blending area is determined by selecting a width candidate from the reordered width candidate list. In the adaptive blending process with TM, the width candidates in the width candidate list can be reordered based on a current template of the current block and reference templates that correspond to the respective width candidates. The samples within the blending area in the current block can be reconstructed by applying the blending process using the selected width candidate.

In an embodiment, the width of the blending area is determined based on N1 width candidates (e.g., N1 width candidates having the smallest TM cost(s)) in the reordered width candidate list. N1 can be less than a number of the width candidates in the width candidate list. TM costs corresponding to the N1 width candidates can be less than or equal to one or more TM costs corresponding to one or more remaining width candidates in the reordered width candidate list.

The indices of the adaptive blend areas can be reordered by the TM costs in an ascending order. In an example, only the best N1 (e.g., 2 or 3) candidates after the TM reordering is selected and signaled for the CU.

In another embodiment, the selected width candidate is a width candidate with the smallest TM cost in the reordered width candidate list. For example, when the TM based reordering is valid for the CU, only the width candidate with the smallest TM cost is used in the CU without signaling the index of the adaptive blending area. When multiple width candidates have the same TM cost, the width candidate with the smallest index value or the largest index value may be selected.

When the adaptive blending condition is not satisfied, the width of the blending area can be determined based on the width candidate list without reordering the width candidates in the width candidate list.

In an embodiment, coding information of the current block indicates whether the adaptive blending condition is satisfied. In an example, a flag is signaled at a CU level to indicate whether a width candidate with the smallest TM cost can be used or not. If the flag is true, the selected blend area can be decided by the TM costs, and the selected blending area corresponding to the smallest TM cost can be used for the specified GPM split mode. In an example, multiple width candidates can have a same TM cost (e.g., the smallest TM cost), a width candidate can be selected to be one of the multiple width candidates that has (i) the smallest index value or (ii) the largest index value. Otherwise, if the flag is false, no reordering of the width candidates in the width candidate list is performed, other adaptive blending methods, such as described in the disclosure, can be used.

In an embodiment, the adaptive blending condition is not satisfied if an above template above the current template or a left template to the left of the current template is not available. The reordering is not valid when one of the above template and the left template is not available. Thus, no reordering of the width candidates in the width candidate list is performed, other adaptive blending methods (e.g., a method of adaptive blend weight index (without reordering)), such as described in the disclosure, can be used to signal the selected adaptive weight index.

Figure 7A:
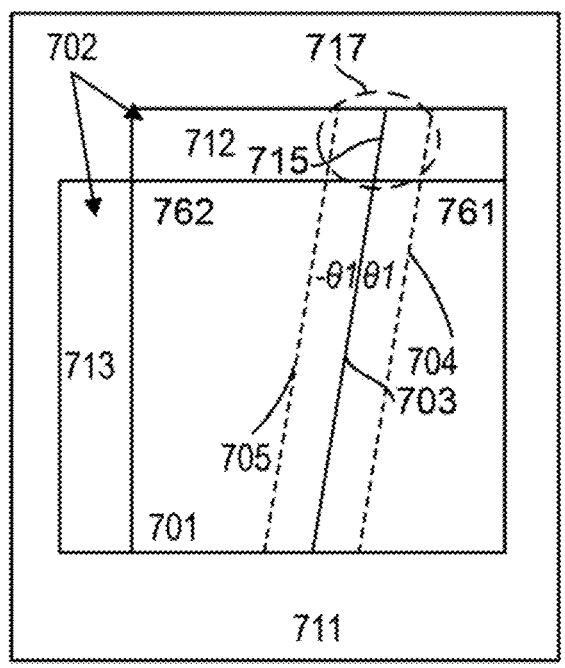
FIGS. 7A-7B show an exemplary adaptive blending process with template matching (TM) according to an embodiment of the disclosure.
Figure 7B:
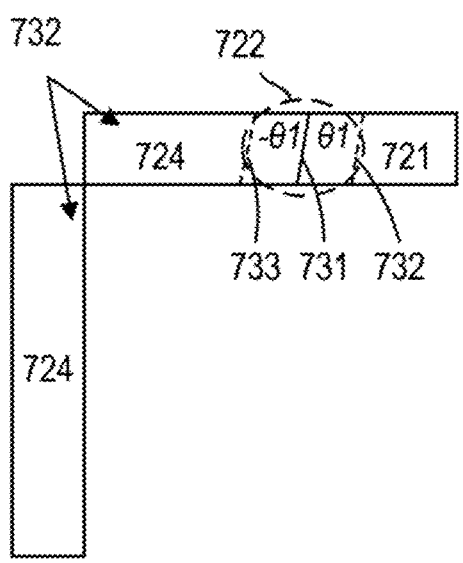

FIGS. 7A-7B show an exemplary adaptive blending process with TM according to an embodiment of the disclosure. A current block (701) in a current picture (711) is to be coded with the GPM along a partition edge (703). A first prediction mode and a second prediction mode can be used in the GPM. The partition edge (703) can correspond to a GPM split mode. A width candidate list can include predefined width candidates such as $\{\theta 1, \theta 2, \theta 3, \theta 4, \theta 5\}$. FIGS. 7A-7B show an example for a width candidate of $\theta 1$. A current template (702) of the current block (701) can include reconstructed samples that are located in adjacent block(s) of the current block (701). In an example, the current template (702) includes a top template (712) that is above the current block (701) and a left template (713) that is to the left of the current block (701).

The partition edge (703) can be extended from the current block (701) into the current template (702). An extended portion (715) of the partition edge (703) can be in the current template (702). A template blending area (717) including template samples in the current template (702) can be between boundaries (704)-(705) that are separated from the extended portion (715) by the distance (or the blending area width) $\theta 1$. The template blending area (717) does not include samples in the current block (701).

For the width candidate $\theta 1$ in the width candidate list, a reference template or a blended reference template (732) corresponding to the respective width candidate $\theta 1$ can be determined based on the GPM and the current template (702). The blending process described in FIG. 4C can be applied to determine the reference template (732) based on the width candidate $\theta 1$ and the current template (702) divided by the partition edge (703). In an example, a first MV of the first prediction mode indicates a first reference block in a first reference picture, and a first reference template of the first reference block is determined based on the current template (702). In an example, a second MV of the second prediction mode indicates a second reference block in a second reference picture, and a second reference template of the second reference block is determined based on the current template (702). In an example, the first reference template and the second reference template have an identical shape and an identical size as those of the current template. In an example, the blended reference template (732) is associated with the first reference picture and the second reference picture. The blended reference template (732) can be determined by the blending process, such as described in FIG. 4C, Eqs. 1-5, and/or the like where a displacement is measured from a sample in the current template (702) to the partition edge (703).

Referring to FIG. 7B, an extended portion (731) of a partition edge that corresponds to the partition edge (703) can intersect with the reference template (732). The extended portion (731) is parallel to the extended portion (715). In an example, reference template samples in the reference template (732) can include first reference template samples in an area (721) whose displacements from the extended portion (731) are larger than or equal to $+\theta 1$, second reference template samples in an area (724) whose displacements from the extended portion (731) is less than or equal to $-\theta 1$, and third reference template samples in a template blending area (722) that are between boundaries (732)-(733). Each of the boundaries (732)-(733) is separated from the extended portion (731) by a distance $\theta 1$ (the blending area width). The template blending area (722) in the reference template (732) corresponds to the template blending area (717) in the current template (702).

The reference template samples in the reference template (732) can be determined based on the blending process such as described in FIG. 4C, Eqs. 2-3, Eqs. 4-5, and/or the like. P0 and P1 can represent prediction values of a reference template sample based on a first prediction mode and a second prediction mode of the GPM, respectively. A weight W can be determined for the reference template sample based on a displacement of the reference template sample in the reference template (732) from the extended portion (731) or based on a displacement of a template sample in the current template (702) from the partition edge (703). For example, the first reference template samples in the area (721) are determined as P0, the second reference template samples in the area (724) are determined as P1, and a third reference template sample in the template blending area (722) is determined as a weighted sum of P0 and P1 using Eq. 1.

A TM cost corresponding to the width candidate $\theta 1$ can be determined based on the current template (702) and the reference template (732). The above descriptions can be applied to other width candidates in the width candidate list, such as $\theta 2, \theta 3, \theta 4,$ and $\theta 5$, to obtain other TM costs (e.g., other 4 TM costs). The width candidates in the width candidate list can be reordered based on the determined TM costs, such as 5 TM costs corresponding to θ1, θ2, θ3, θ4, and θ5, respectively.

As described above, TM costs of the current template (702) and the respective reference templates for possible blending areas (e.g., all possible blending areas) such as {θ1, θ2, θ3, θ4, θ5} can be calculated to reorder the indices indicating the adaptive blending areas. The adaptive blending areas or the corresponding indices can be reordered based on the TM costs in an ascending order.

In an example, the current block (701) is divided into two GPM partitions (761)-(762) by the partition edge (703). The GPM partitions (761)-(762) can be predicted by the first prediction mode and the second prediction mode, such as described in FIG. 4C or Eqs. 1-3. The first prediction mode and the second prediction mode are inter prediction modes with first motion information (e.g., first MV(s)) and second motion information (e.g., second MV(s)), respectively. Each TM cost corresponding to a blending area width (e.g., θ1) is calculated using the current template (702) and the reference template (e.g., (732) corresponding to θ1). The reference template (e.g., (732)) can be derived from the first motion information (e.g., the first MV(s)) and the second motion information (e.g., the second MV(s)) based on the blending method (e.g., the blending method described in FIG. 4C or Eqs. 1-3) for the samples in a template area that is covered by the extended blending area. In an example, a sum of absolute difference (SAD) between the current template (702) and the reference template (e.g., (732)) is used as the TM cost.

Figure 8A:
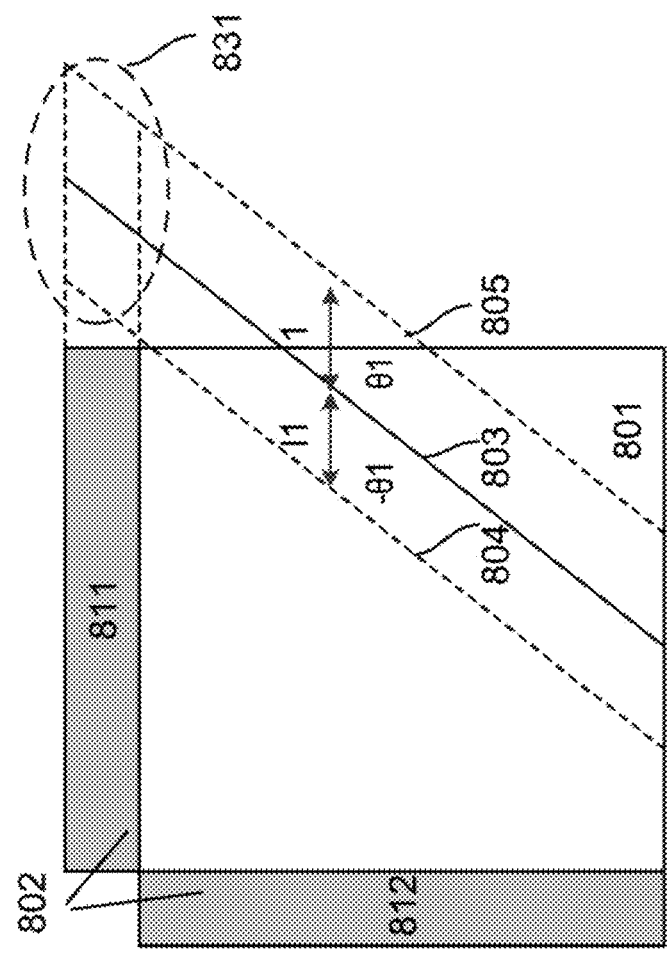
FIGS. 8A-8B show exemplary blending areas that are not fully covered within a template for template matching according to embodiments of the disclosure.
Figure 8B:
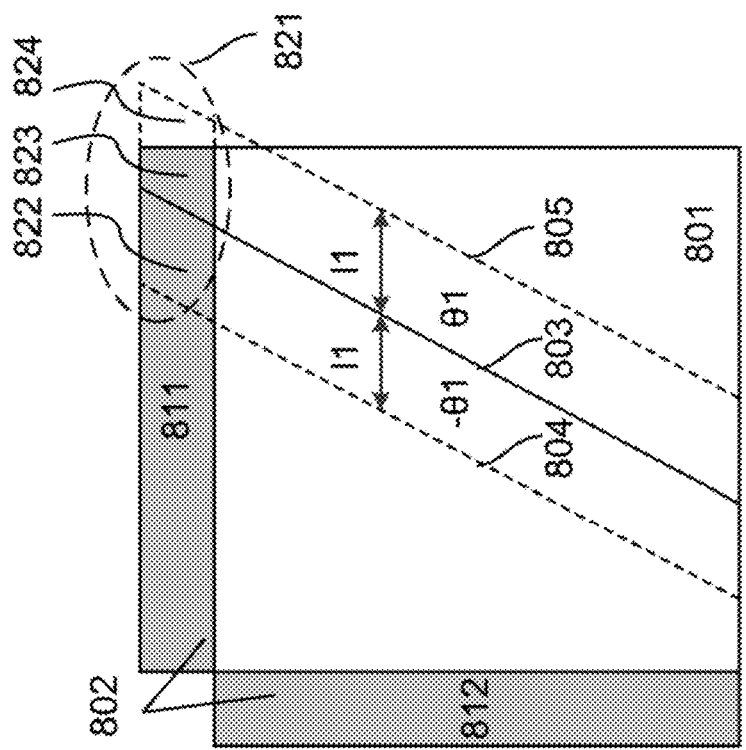

FIGS. 8A-8B show exemplary blending areas that are not fully covered within a template for template matching according to embodiments of the disclosure. In FIGS. 8A-8B, a current block (801) is coded with the GPM. A partition edge (803) can divide the current block (801) into two partitions. A current template (802) can include a top template (811) and a left template (812). Boundaries (804)-(805) can be located on opposite sides of the partition edge (803) and can be shifted from the partition edge (803) by a distance l1 based on θ1 and an orientation of the partition edge (803). The boundaries (804)-(805) are parallel to the partition edge (803).

In FIG. 8A, the partition edge (803) can be extended into the current template (802). The partition edge (803) can intersect the current template (802). For a width candidate such as θ1, only a partial blending area (e.g., a partial template blending area) is covered within the current template (802). A template blending area (821) in FIG. 8A can include an area between the boundaries (804)-(805). The template blending area (821) does not include samples in the current block (801).

Referring to FIG. 8A, the template blending area (821) is partially covered by the current template (802). For example, the template blending area (821) can include a first area (822) (in gray) between the boundary (804) and the partition edge (803) that overlaps with the current template (802), a second area (823) (in gray) between the boundary (805) and the partition edge (803) that overlaps with the current template (802), and a third area (824) (in white) to the right of the current template (802). The first area (822) and the second area (823) in the template blending area (821) are covered by the current template (802), and the third area (824) is not covered by the current template (802).

Referring to FIG. 8B, the partition edge (803) does not intersect the current template (802). For example, the extended partition edge (803) is outside the current template (802). A template blending area (831) can include an area between the boundaries (804)-(805). The template blending area (831) does not include samples in the current block (801). The template blending area (831) is fully outside the current template (802).

Referring to FIG. 7A, the adaptive blending condition can be satisfied when the template blending area (e.g., (717)) is fully covered by the current template (e.g., (702)) for each width candidate in the width candidate list {θ1, θ2, θ3, θ4, θ5}. The adaptive blending condition can be satisfied when the template blending area (e.g., (717)) is fully covered by the current template (e.g., (702)) for the largest width candidate (e.g., θ5) in the width candidate list {θ1, θ2, θ3, θ4, θ5}.

Referring to FIGS. 8A-8B, the adaptive blending condition is not satisfied when the template blending area (e.g., (821) or (831)) is not fully covered by the current template (e.g., (802)) for a width candidate in the width candidate list {θ1, θ2, θ3, θ4, θ5}. In FIG. 8A, the partition edge (803) intersects the current template (802), however, the adaptive blending condition is not satisfied when the template blending area (821) is not fully covered by the current template (802).

In FIG. 8B, the partition edge (803) does not intersect the current template (802), and the adaptive blending condition is not satisfied. In an example, the template blending area (831) is not covered by the current template (802), and the adaptive blending condition is not satisfied.

When the template blending area is not fully covered by the current template for a width candidate in the width candidate list, such as shown in FIGS. 8A-8B, the template blending area is denoted as not valid (e.g., NOT VALID) for reordering by TM for the GPM split mode, and no reordering of the width candidates in the width candidate list is performed for the GPM split mode. An index indicating the size of the blending area for the GPM split mode can be determined based on the width candidate list that is not reordered.

In an embodiment, the reordering is not valid when a potential blending area (e.g., all possible blending areas) cannot be fully covered within the current template. In this case, other signaling methods of an adaptive blend weight index can be used to signal the selected adaptive weight index.

In an embodiment, a blending area is not valid for reordering for a GPM split mode when the blending area cannot be fully covered within the current template. The invalid blending area is not available for signaling for the specified GPM split mode.

In an embodiment, the current block is coded with the GPM along a partition edge. A blending area that surrounds the partition edge can be defined by boundaries on both sides of the partition edge. The boundaries can be parallel to the partition edge. A width of the blending area measured perpendicular to the partition edge can be determined based on a predefined width candidate list including width candidates. According to an embodiment of the disclosure, a subset of width candidates or a subset of blending areas can be adaptively chosen, for example, at a CU level or a slice level according to signaled information at the corresponding level (e.g., the CU level or the slice level). Only the selected subset of width candidates or the selected subset of blending areas may be signaled to reduce a signaling cost.

The subset of width candidates can be determined based on the predefined width candidate list, and a number of width candidates in the subset can be less than a number of the width candidates in the predefined width candidate list. The subset of width candidates can be from the predefined width candidate list. The width of the blending area to be used for the current block can be determined by selecting a width candidate from the subset of width candidates. In an example, an index indicating the width of the blending area can be signaled. The samples within the blending area in the current block can be reconstructed by applying a blending process using the selected width candidate.

In an embodiment, N2 smallest width candidates can be selected from the predefined width candidate list as the subset of width candidates if screen content coding tool(s) are enabled for a plurality of blocks including the current block. For example, only the first N2 (e.g., 2 or 3) narrowest blend areas are signaled in the slice level or the CU level when the screen content coding tool(s) are enabled, for example, in a sequence parameter set (SPS), a picture parameter set (PPS), or the slice level. The screen content coding tool(s) can include tool(s) for coding screen content, such as an IBC mode, palette coding, and/or the like. In an example, when a screen content coding tool is applied to the current block, N2 is 1 and the width of the blending area is the smallest width candidate in the predefined width candidate list, such as 0 or ½. The width of the blending area being 0 is equivalent to the GPM blending is disabled for the CU, for example, with the weight W being 0 or 1 in Eq. 1.

In an embodiment, the subset of width candidates can be determined based on a difference (or a motion difference) of two MVs of a first partition and a second partition of the current block that are divided by the partition edge. For example, only a subset of blending areas is selected according to a motion difference of two parsed MVs between a merge index 0 and a merge index 1 that are associated with the first partition and the second partition, respectively. Two motion difference thresholds can be predefined as a first threshold (denoted by thr1) and a second threshold (denoted by thr2), and thr1 is smaller than thr2. In an example, a number of width candidates in each subset of width candidates is the same.

For example, 5 width candidates (e.g., 5 possible blending areas), such as $\{θ1, θ2, θ3, θ4, θ5\}$, are available for the GPM. For a natural content with SCC coding tool(s) disabled for the current block, when the motion difference is less than the first threshold (thr1), a first subset of width candidates (e.g., $\{θ1, θ2, θ3\}$) can be used as the subset of width candidates. When the motion difference is between the first threshold (thr1) and the second threshold (thr2) (e.g., the motion difference is larger than or equal to the first threshold and is less than or equal to the second threshold), a second subset of width candidates (e.g., $\{θ2, θ3, θ4\}$) different from the first subset can be used as the subset of width candidates for the current block with the parsed GPM split mode. When the motion difference is larger than the second threshold (thr2), a third subset of width candidates (e.g., $\{θ3, θ4, θ5\}$) different from the first subset and the second subset can be used as the subset of width candidates for the current block. In a bi-prediction block coded with the GPM, the motion difference can be a maximum value of the motion difference for a reference list 0 and the motion difference for a reference list 1. In an example, widths in an ascending order include $θ1, θ2, θ3, θ4$, and $θ5$, the first subset of width candidates includes the three narrowest blend areas $\{θ1, θ2, θ3\}$, the second subset of width candidates includes the middle 3 blending areas $\{θ2, θ3, θ4\}$, and the third subset of width candidates includes the largest 3 blend areas $\{θ3, θ4, θ5\}$.

In an embodiment, the partition edge is extended into a current template with an extended portion in the current template, and the subset of width candidates can be determined based on a difference of samples values across the extended portion of the partition edge. The current template can include samples in left neighboring reconstructed block (s) and/or above neighboring reconstructed block(s) of the current block. The samples used to calculate the difference of sample values can be in the current template. In some examples, the difference of samples values is referred to as a gradient value of samples across the extended portion of the partition edge.

In an example, only a subset of blend area or the subset of width candidates is signaled in the CU level according to the difference of samples values (e.g., the gradient value of the prediction samples) across the extended portion of the partition edge or the GPM split boundary. Two sample difference thresholds (e.g., two gradient thresholds) can be predefined as a first gradient threshold (denoted by gthr1) and a second gradient threshold (denoted by gthr2), and gthr1 is smaller than gthr2. For example, 5 width candidates (e.g., 5 possible blending areas), such as $\{θ1, θ2, θ3, θ4, θ5\}$, are available for the GPM. When the gradient value is less than the first gradient threshold (gthr1), a fourth subset of width candidates (e.g., $\{θ3, θ4, θ5\}$) can be used as the subset of width candidates for the current block. When the gradient value is between the first gradient threshold (gthr1) and the second gradient threshold (gthr2), a fifth subset of width candidates (e.g., $\{θ2, θ3, θ4\}$) different from the fourth subset can be used as the subset of width candidates for the current block with the parsed GPM split mode. When the gradient value is larger than the second gradient threshold (gthr2), a sixth subset of width candidates (e.g., $\{θ1, θ2, θ3\}$) different from the fourth subset and the fifth subset can be used as the subset of width candidates. In an example, widths in an ascending order include $θ1, θ2, θ3, θ4$, and $θ5$, the sixth subset of width candidates includes the three narrowest blend areas $\{θ1, θ2, θ3\}$, the fifth subset of width candidates includes the middle 3 blending areas $\{θ2, θ3, θ4\}$, and the fourth subset of width candidates includes the largest 3 blend areas $\{θ3, θ4, θ5\}$.

In an example, $\{θ1, θ2, θ3, θ4, θ5\}$ is $\{0, 1, 2, 4, 8\}$. In an example, $\{θ1, θ2, θ3, θ4, θ5\}$ is $\{½, 1, 2, 4, 8\}$.

Figure 9:
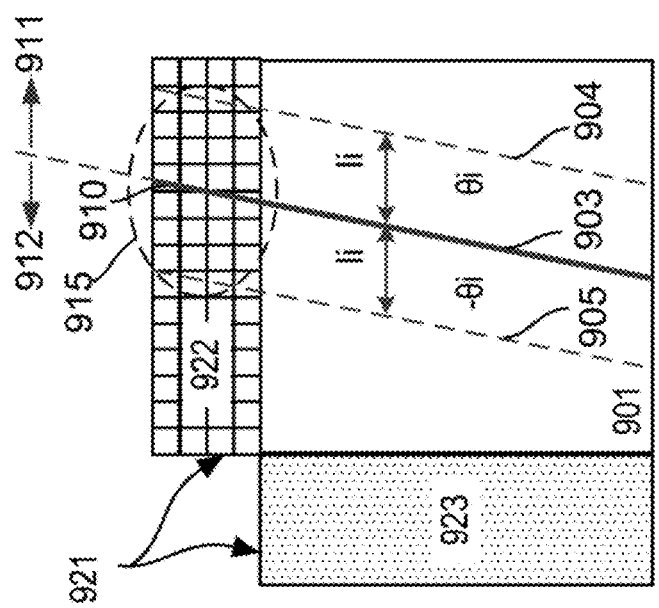
FIG. 9 shows an example of obtaining a difference of sample values across a partition edge according to an embodiment of the disclosure.

FIG. 9 shows an example of obtaining a difference of sample values (also referred to as a gradient value) across a partition edge according to an embodiment of the disclosure. A current block (901) is coded with a GPM split mode. In the GPM split mode, a partition edge (903) can divide the current block (901) into two partitions. A predefined width candidate list can include width candidates, such as $\{θ1, θ2, θ3, θ4, θ5\}$. The difference of sample values can be determined for one (e.g., $θi$, $i=1, 2, 3, 4$, or 5) of the width candidates, such as described in FIG. 9.

Referring to FIG. 9, a first boundary (904) and a second boundary (905) can be located on opposite sides of the partition edge (903) and can be shifted from the partition edge (903) by a distance li based on $θi$ and an orientation of the partition edge (903). The partition edge (903), the first boundary (904), and the second boundary (905) can be extended into a current template (921). The current template (921) can include a top template (922) and a left template (923), as described above.

An area (915) between the first boundary (904) and the second boundary (905) that is within the current template (921) can be used to determine the difference of sample values. An extended portion (910) of the partition edge (903) that is within the current template (921) can divide the current template (921) into two templates (911)-(912) that are on different sides of the extended portion (910). In the example of FIG. 9, the template (912) includes the left template (923) and a left portion of the top template (922), and the template (911) includes a right portion of the top template (922). The difference of sample values can be determined based on sample difference(s) across the extended portion (910), which is a boundary between the two templates.

In an embodiment, a first sample average is obtained based on first template samples that surround and/or intersect the extended portion (910), and a second sample average is obtained based on second template samples that surround and/or intersect the first boundary (904) or the second boundary (905). The difference of sample values can be an absolute difference between the first sample average and the second sample average. The first template samples and the second template samples are in the area (915).

In another embodiment, the difference of sample values can be an average of absolute sample differences between the first template samples and the respective second template samples.

In an example, referring to Eqs. 4-6, the second sample average is derived from an average of sample values with a weight index (e.g., weightIdx) being 0 (e.g., indicating that the samples fall on the second boundary (905) that is in the current template (921)). The first sample average is derived from an average of sample values with a weight index (e.g., weightIdx) being $16 \times \theta_i$ (e.g., indicating that the samples fall on the extended portion (910)). The weight index (e.g., weightIdx) can be calculated according to the distance between the template sample $(x_c, y_c)$ and a center position of the current block. The weight index (e.g., weightIdx) can be calculated using Eq. 6 with $\theta$ being $\theta_i$. $\theta_i$ can be one of the width candidates in the predefined width candidate list. In an example, $\theta_i$ is 8. In an example, $\theta_i$ is 2 or other values. d(m, n) is $16 \times d_{x_c, y_c}$ as described in Eq. 5.

The first sample average and the second sample average with weightIdx being $16 \times \theta_i$ and 0 can be obtained as described in FIG. 9. The difference of sample values can be an absolute difference between the first sample average and the second sample average, as described above.

In an embodiment, the largest 3 blend areas, such as {2, 4, 8}, is used as the subset of width candidates when an intra mode and an inter mode are used in the GPM to predict the current block (901). In an example, a first GPM partition is predicted from an intra mode, and a second GPM partition is predicted from an inter mode.

Figure 10:
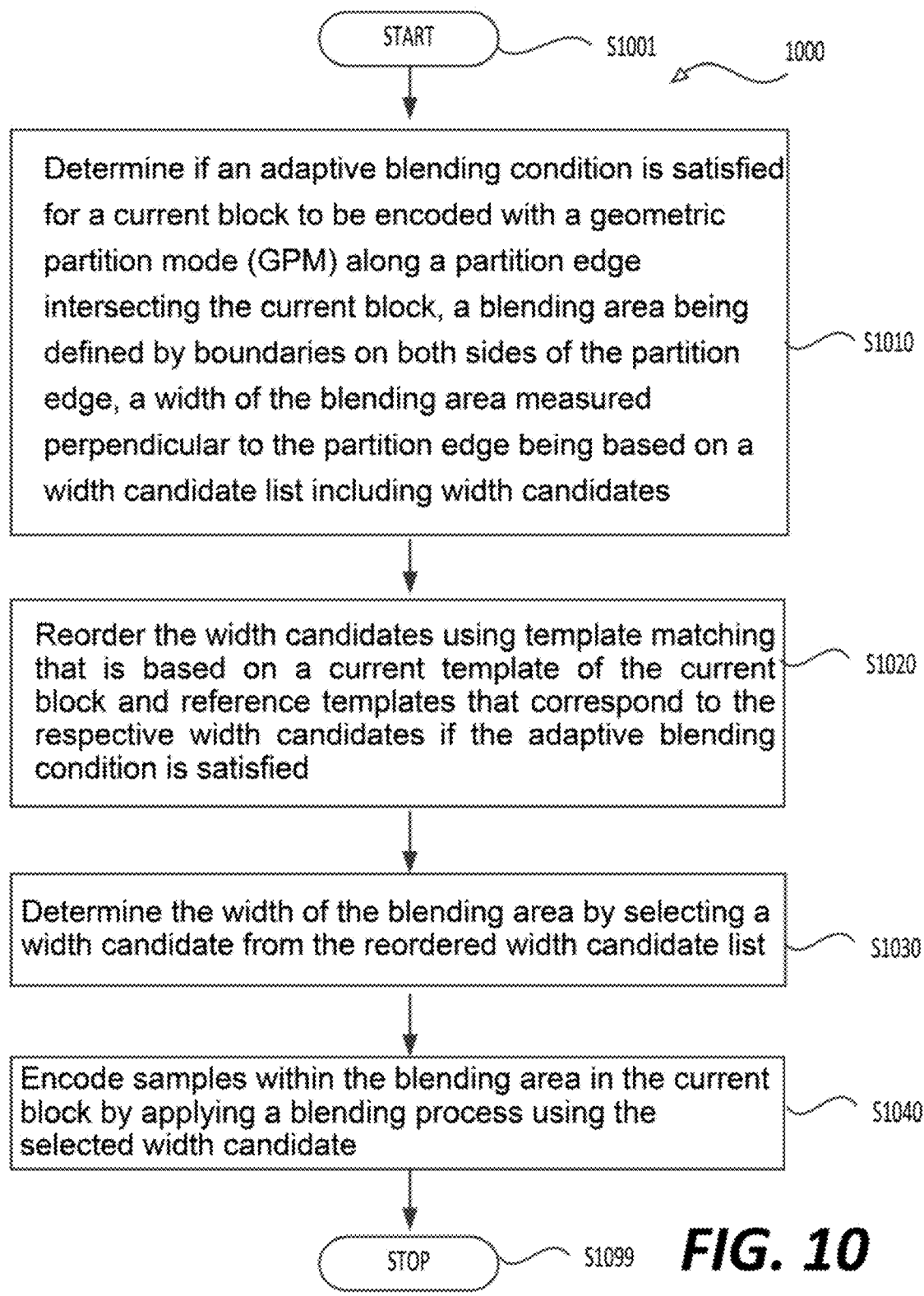
FIG. 10 shows a flow chart outlining an encoding process according to an embodiment of the disclosure.

FIG. 10 shows a flow chart outlining a process (1000) according to an embodiment of the disclosure. The process (1000) can be used in a video encoder. In various embodiments, the process (1000) is executed by processing circuitry, such as the processing circuitry that performs functions of the video encoder (103), the processing circuitry that performs functions of the video encoder (303), and the like. In some embodiments, the process (1000) is implemented in software instructions, thus when the processing circuitry executes the software instructions, the processing circuitry performs the process (1000). The process (1000) starts at (S1001) and proceeds to (S1010).

At (S1010), if an adaptive blending condition is satisfied for a current block can be determined. The current block is to be encoded with a geometric partition mode (GPM) along a partition edge intersecting the current block. A blending area that surrounds the partition edge can be defined by boundaries (e.g., a first boundary and a second boundary) on both sides of the partition edge. The boundaries can be parallel to the partition edge. A width of the blending area measured perpendicular to the partition edge can be based on a width candidate list including width candidates. If the adaptive blending condition is determined to be satisfied, the process (1000) can proceed to (S1020).

If the adaptive blending condition is determined not to be satisfied, the width of the blending area can be determined based on the width candidate list without reordering the width candidates in the width candidate list and samples within the blending area in the current block can be reconstructed by applying the blending process, such as described in FIG. 4C. The process (1000) can proceed to (S1099), and terminates.

For a width candidate (e.g., the largest width candidate) in the width candidate list, an area (e.g., the template blending area (821) or (831)) can be defined by a first boundary and a second boundary (e.g., (804)-(805)) that are parallel to the partition edge. The area does not include samples in the current block. The first boundary and the second boundary can be on opposite sides of the partition edge. In an embodiment, if the area is only partially covered by the current template, such as shown in FIG. 8A, or the area is fully outside the current template, such as shown in FIG. 8B, the adaptive blending condition is determined not to be satisfied.

In an example, the first boundary and the second boundary have a distance of the largest width candidate in the width candidate list from the partition edge, and an extended portion of the partition edge intersects the current template. The area between the first boundary and the second boundary includes a first area and a second area. The area can include the extended portion of the partition edge. The first area is an area between the first boundary and the partition edge that overlaps with the current template. The second area is an area between the second boundary and the partition edge that overlaps with the current template. The adaptive blending condition can be determined as satisfied based on the first area being equal to the second area. Referring to FIG. 7A, the first area in the area (717) is equal to the second area in the area (717), and the adaptive blending condition is determined as satisfied. The adaptive blending condition can be determined as not satisfied based on the first area being not equal to the second area. Referring to FIG. 8A, the first area (e.g., (822)) is not equal to the second area (e.g., (823)), and the adaptive blending condition is determined as not satisfied.

In an example, the extended portion of the partition edge (e.g., (803) in FIG. 8B) does not intersect the current template (e.g., (802) in FIG. 8B), the adaptive blending condition can be determined as not satisfied.

In an example, the adaptive blending condition is determined as not satisfied if an above template above the current block or a left template to the left of the current block is not available.

At (S1020), the width candidates in the width candidate list can be reordered using template matching (TM) that is based on a current template of the current block and reference templates that correspond to the respective width candidates.

In an embodiment, the partition edge can be extended from the current block into the current template, and an extended portion of the partition edge can be in the current template. For each width candidate in the width candidate list, a reference template corresponding to the respective width candidate can be determined based on the GPM and the current template. Reference samples within a template blending area that surround the extended portion of the partition edge can be determined based on a blending process. The template blending area can be in the reference template, and a width of the template blending area can be based on the respective width candidate. A TM cost corresponding to the respective width candidate can be determined based on the current template and the reference template and the width candidate list can be reordered based on the determined TM costs.

At (S1030), the width of the blending area can be determined by selecting a width candidate from the reordered width candidate list.

In an embodiment, the width of the blending area is based on N1 width candidates in the reordered width candidate list. N1 can be less than a number of the width candidates in the width candidate list. TM costs corresponding to the N1 width candidates can be less than or equal to one or more TM costs corresponding to one or more remaining width candidates in the reordered width candidate list. For example, the width of the blending area is selected from the N1 width candidates having the smallest TM cost(s) in the reordered width candidate list.

In an example, the selected width candidate is a width candidate with the smallest TM cost in the reordered width candidate list.

At (S1040), samples within the blending area in the current block can be encoded by applying a blending process using the selected width candidate.

In an example, coding information (e.g., an index) of the current block indicating the selected width candidate in the reordered width candidate list is encoded and included in a bitstream to be sent to a decoder.

In an example, the coding information of the current block indicates whether the adaptive blending condition is satisfied.

The process (1000) then proceeds to (S1099), and terminates.

The process (1000) can be suitably adapted to various scenarios and steps in the process (1000) can be adjusted accordingly. One or more of the steps in the process (1000) can be adapted, omitted, repeated, and/or combined. Any suitable order can be used to implement the process (1000). Additional step(s) can be added.

Figure 11:
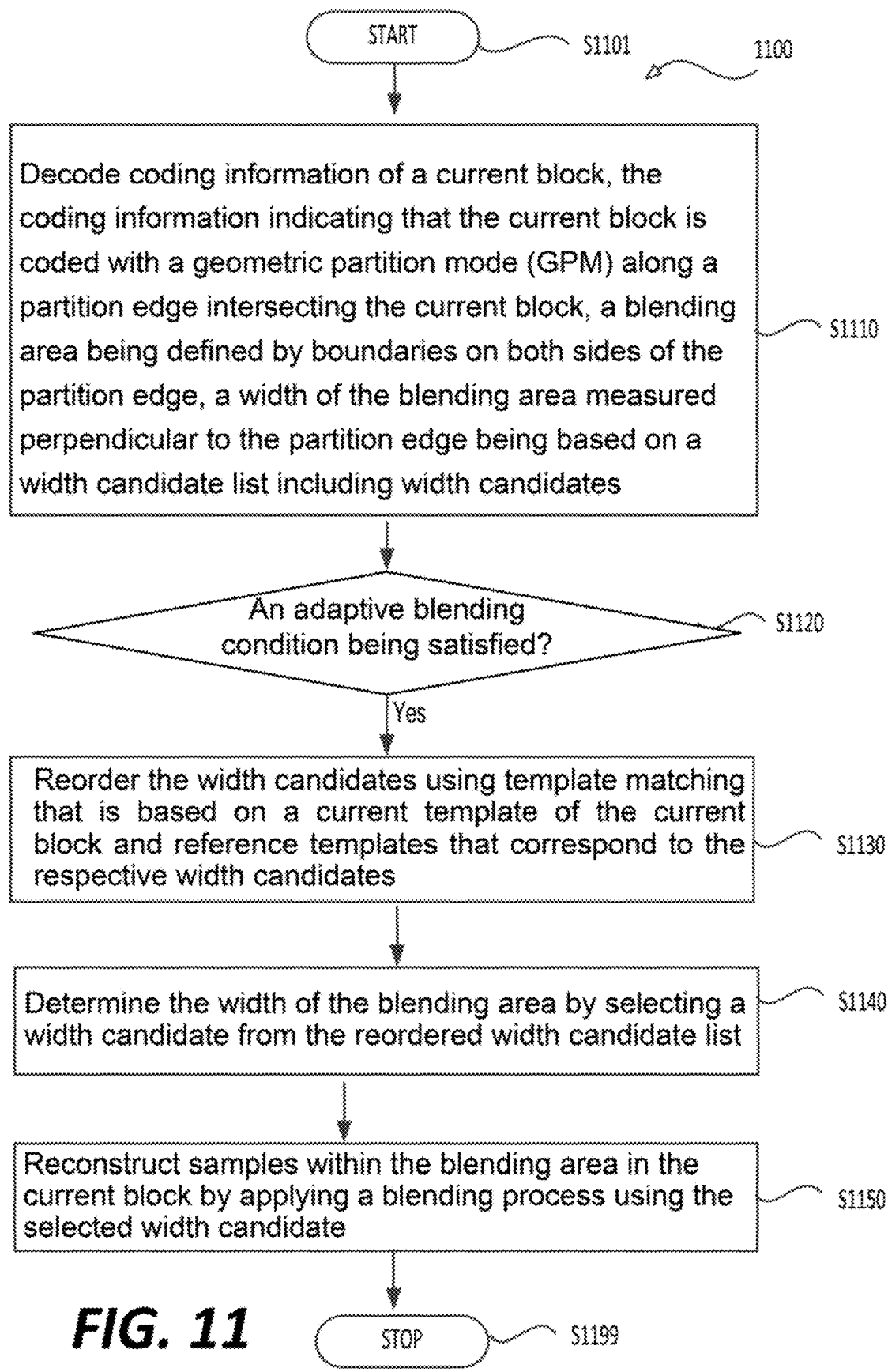
FIG. 11 shows a flow chart outlining a decoding process according to an embodiment of the disclosure.

FIG. 11 shows a flow chart outlining a process (1100) according to an embodiment of the disclosure. The process (1100) can be used in a video decoder. In various embodiments, the process (1100) is executed by processing circuitry, such as the processing circuitry that performs functions of the video decoder (110), the processing circuitry that performs functions of the video decoder (210), and the like. In some embodiments, the process (1100) is implemented in software instructions, thus when the processing circuitry executes the software instructions, the processing circuitry performs the process (1100). The process (1100) starts at (S1101) and proceeds to (S1110).

At (S1110), coding information of a current block in a current picture can be decoded. The coding information can indicate that the current block is coded with a geometric partition mode (GPM) along a partition edge (e.g., (452)) intersecting the current block. A blending area that surrounds the partition edge can be defined by boundaries (e.g., (471)-(472)) on both sides of the partition edge. The boundaries can be parallel to the partition edge. A width of the blending area measured perpendicular to the partition edge can be based on a width candidate list including width candidates.

At (S1120), whether an adaptive blending condition is satisfied can be determined. If the adaptive blending condition is determined as satisfied, the process (1100) can proceed to (S1130).

In an example, the coding information of the current block indicates whether the adaptive blending condition is satisfied.

If the adaptive blending condition is determined as not satisfied, the width of the blending area can be determined based on the width candidate list without reordering the width candidates in the width candidate list and samples within the blending area in the current block can be reconstructed by applying the blending process. Then, the process (1100) can proceed to (S1199), and terminates.

For a width candidate (e.g., the largest width candidate) in the width candidate list, an area (e.g., the template blending area (821) or (831)) can be defined by a first boundary and a second boundary (e.g., (804)-(805)) that are parallel to the partition edge. The area does not include samples in the current block. The first boundary and the second boundary can be on opposite sides of the partition edge. In an embodiment, if the area is only partially covered by the current template, such as shown in FIG. 8A, or the area is fully outside the current template, such as shown in FIG. 8B, the adaptive blending condition is determined not to be satisfied.

In an example, the first boundary and the second boundary have a distance of the largest width candidate in the width candidate list from the partition edge, and an extended portion of the partition edge intersects the current template. The area between the first boundary and the second boundary includes a first area and a second area. The area can include the extended portion of the partition edge. The first area is an area between the first boundary and the partition edge that overlaps with the current template. The second area is an area between the second boundary and the partition edge that overlaps with the current template. The adaptive blending condition can be determined as satisfied based on the first area being equal to the second area. Referring to FIG. 7A, the first area in the area (717) is equal to the second area in the area (717), and the adaptive blending condition is determined as satisfied. The adaptive blending condition can be determined as not satisfied based on the first area being not equal to the second area. Referring to FIG. 8A, the first area (e.g., (822)) is not equal to the second area (e.g., (823)), and the adaptive blending condition is determined as not satisfied.

In an example, the extended portion of the partition edge (e.g., (803) in FIG. 8B) does not intersect the current template (e.g., (802) in FIG. 8B), the adaptive blending condition can be determined as not satisfied.

In an example, the adaptive blending condition is determined as not satisfied if an above template above the current block or a left template to the left of the current block is not available.

At (S1130), the width candidates in the width candidate list can be reordered using template matching (TM) that is based on a current template of the current block and reference templates that correspond to the respective width candidates.

In an embodiment, the partition edge can be extended from the current block into the current template, and an extended portion of the partition edge can be in the current template. For each width candidate in the width candidate list, a reference template corresponding to the respective width candidate can be determined based on the GPM and the current template. Reference samples within a template blending area that surround the extended portion of the partition edge can be determined based on a blending process. The template blending area can be in the reference template, and a width of the template blending area can be based on the respective width candidate. A TM cost corresponding to the respective width candidate can be determined based on the current template and the reference template and the width candidate list can be reordered based on the determined TM costs.

At (S1140), the width of the blending area can be determined by selecting a width candidate from the reordered width candidate list.

In an embodiment, the width of the blending area is based on N1 width candidates in the reordered width candidate list. N1 can be less than a number of the width candidates in the width candidate list. TM costs corresponding to the N1 width candidates can be less than or equal to one or more TM costs corresponding to one or more remaining width candidates in the reordered width candidate list. For example, the width of the blending area is selected from the N1 width candidates having the smallest TM cost(s) in the reordered width candidate list.

In an example, the selected width candidate is a width candidate with the smallest TM cost in the reordered width candidate list.

At (S1150), samples within the blending area in the current block can be reconstructed by applying a blending process using the selected width candidate.

The process (1100) proceeds to (S1199), and terminates.

The process (1100) can be suitably adapted to various scenarios and steps in the process (1100) can be adjusted accordingly. One or more of the steps in the process (1100) can be adapted, omitted, repeated, and/or combined. Any suitable order can be used to implement the process (1100). Additional step(s) can be added.

In an embodiment, a video bitstream comprising a current block in a current picture is received. A value of a syntax element associated with the current block in the current picture is decoded. The syntax element indicates whether the current block is coded with a GPM along a partition edge intersecting the current block. If the value of the syntax element indicates that the current block is coded with the GPM and a condition for adaptive blending is satisfied, width candidates in a width candidate list can be reordered using TM that is based on a current template of the current block and reference templates that correspond to the respective width candidates. A width candidate can be selected from the reordered width candidate list. A width of a blending area can be determined based on the selected width candidate. The blending area surrounds the partition edge as defined by boundaries on both sides of the partition edge. The boundaries are parallel to the partition edge, and the width of the blending area is measured perpendicular to the partition edge. The blending area can be determined based on the width of the blending area. Samples within the blending area in the current block can be reconstructed by applying the adaptive blending using the determined blending area.

Figure 12:
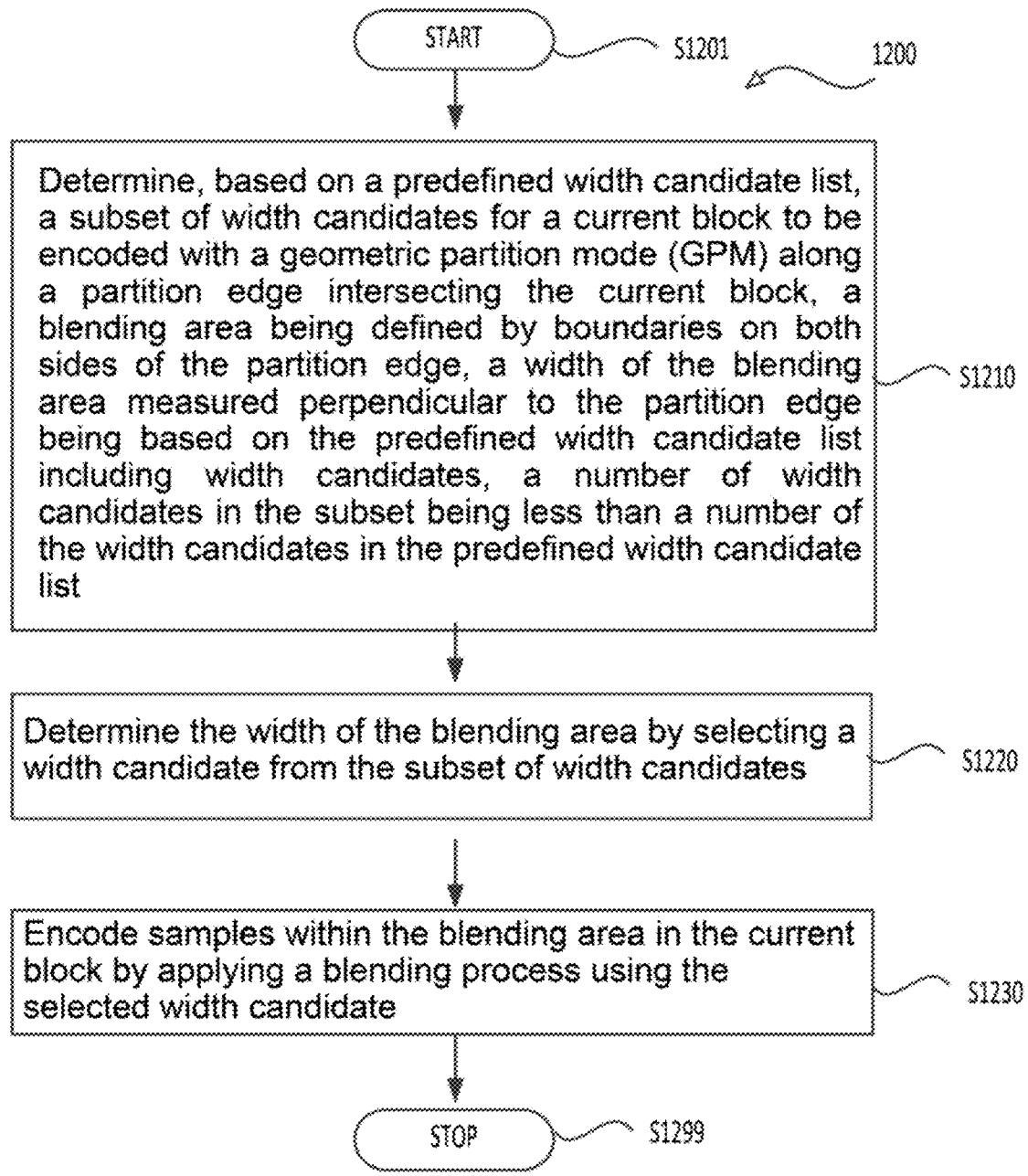
FIG. 12 shows a flow chart outlining an encoding process according to an embodiment of the disclosure.

FIG. 12 shows a flow chart outlining a process (1200) according to an embodiment of the disclosure. The process (1200) can be used in a video encoder. In various embodiments, the process (1200) is executed by processing circuitry, such as the processing circuitry that performs functions of the video encoder (103), the processing circuitry that performs functions of the video encoder (303), and the like. In some embodiments, the process (1200) is implemented in software instructions, thus when the processing circuitry executes the software instructions, the processing circuitry performs the process (1200). The process (1200) starts at (S1201) and proceeds to (S1210).

At (S1210), a subset of width candidates for a current block to be encoded with a geometric partition mode (GPM) along a partition edge intersecting the current block can be determined based on a width candidate list (e.g., a predefined width candidate list). A blending area that surrounds the partition edge can be defined by boundaries on both sides of the partition edge. The boundaries can be parallel to the partition edge. A width of the blending area measured perpendicular to the partition edge can be based on a predefined width candidate list including width candidates. In an example, a number of width candidates in the subset is less than a number of the width candidates in the predefined width candidate list.

In an embodiment, N2 smallest width candidates is selected from the predefined width candidate list as the subset of width candidates if a screen content coding tool is enabled for a plurality of blocks including the current block.

In an embodiment, the subset of width candidates is determined based on a difference of two motion vectors of a first prediction mode and a second prediction mode used in the GPM to reconstruct the current block. In an example, screen content coding tools are disabled for the current block, and a first threshold is less than a second threshold. The subset of width candidates is determined as a first subset of width candidates if the difference of the two motion vectors is less than the first threshold. The subset of width candidates is determined as a second subset of width candidates if the difference of the two motion vectors is larger than or equal to the first threshold and is less than or equal to the second threshold. The subset of width candidates is determined as a third subset of width candidates if the difference of the two motion vectors is larger than the second threshold.

In an embodiment, the partition edge is extended into a current template with an extended portion in the current template. The current template can include samples in a left neighboring reconstructed block and/or an above neighboring reconstructed block of the current block. The subset of width candidates can be determined based on a difference of sample values across the extended portion of the partition edge. The samples are in the current template. In an example, a first sample difference threshold is less than a second sample difference threshold. The subset of width candidates is determined as a fourth subset of width candidates if an absolute value of the difference of sample values is less than the first sample difference threshold. The subset of width candidates is determined as a fifth subset of width candidates if the absolute value of the difference of sample values is larger than or equal to the first threshold and is less than or equal to the second sample difference threshold. The subset of width candidates is determined as a sixth subset of width candidates if the absolute value of the difference of sample values is larger than the second sample difference threshold.

In an example, a partition of the current block is predicted by intra prediction. Three largest width candidates can be selected from the predefined width candidate list as the subset of width candidates At (S1220), the width of the blending area can be determined by selecting a width candidate from the subset of width candidates.

At (S1230), samples within the blending area in the current block can be encoded by applying a blending process using the selected width candidate.

In an example, coding information (e.g., an index) of the current block indicating the selected width candidate in the subset of width candidates is encoded and is included in a bitstream to be sent to a decoder.

The process (1200) then proceeds to (S1299), and terminates.

The process (1200) can be suitably adapted to various scenarios and steps in the process (1200) can be adjusted accordingly. One or more of the steps in the process (1200) can be adapted, omitted, repeated, and/or combined. Any suitable order can be used to implement the process (1200). Additional step(s) can be added.

Figure 13:
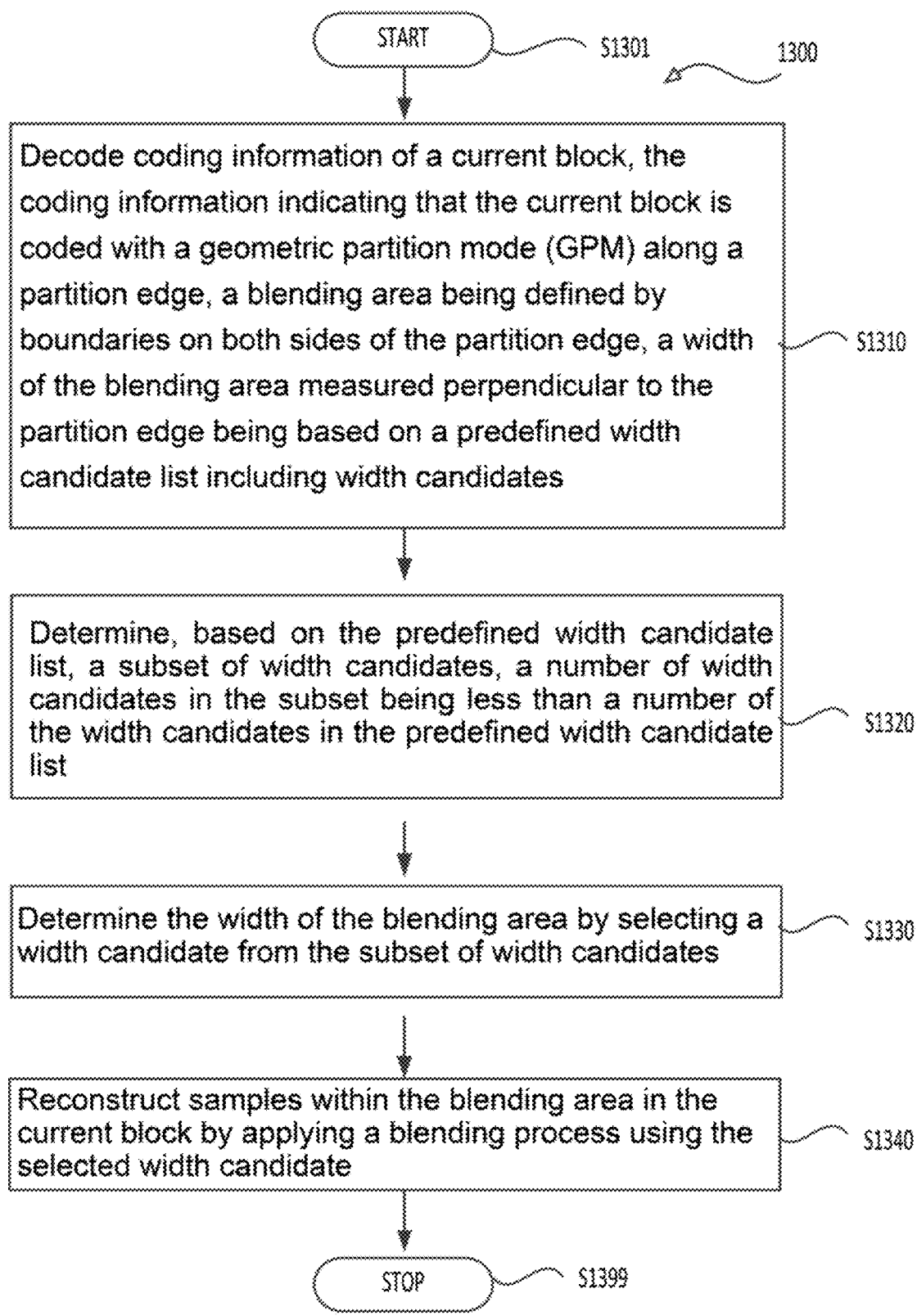
FIG. 13 shows a flow chart outlining a decoding process according to an embodiment of the disclosure.

FIG. 13 shows a flow chart outlining a process (1300) according to an embodiment of the disclosure. The process (1300) can be used in a video decoder. In various embodiments, the process (1300) is executed by processing circuitry, such as the processing circuitry that performs functions of the video decoder (110), the processing circuitry that performs functions of the video decoder (210), and the like. In some embodiments, the process (1300) is implemented in software instructions, thus when the processing circuitry executes the software instructions, the processing circuitry performs the process (1300). The process (1300) starts at (S1301) and proceeds to (S1310).

At (S1310), coding information of a current block in a current picture can be decoded. The coding information can indicate that the current block is coded with a geometric partition mode (GPM) along a partition edge (e.g., (452)) intersecting the current block. A blending area that surrounds the partition edge can be defined by boundaries (e.g., (471)-(472)) on both sides of the partition edge. The boundaries can be parallel to the partition edge. A width of the blending area measured perpendicular to the partition edge can be based on a width candidate list (e.g., a predefined width candidate list) including width candidates.

At (S1320), a subset of width candidates can be determined based on the predefined width candidate list. In an example, a number of width candidates in the subset is less than a number of the width candidates in the predefined width candidate list.

In an embodiment, N2 smallest width candidates is selected from the predefined width candidate list as the subset of width candidates if a screen content coding tool is enabled for a plurality of blocks including the current block.

In an embodiment, the subset of width candidates is determined based on a difference of two motion vectors of a first prediction mode and a second prediction mode used in the GPM to reconstruct the current block. In an example, screen content coding tools are disabled for the current block, and a first threshold is less than a second threshold. The subset of width candidates is determined as a first subset of width candidates if the difference of the two motion vectors is less than the first threshold. The subset of width candidates is determined as a second subset of width candidates if the difference of the two motion vectors is larger than or equal to the first threshold and is less than or equal to the second threshold. The subset of width candidates is determined as a third subset of width candidates if the difference of the two motion vectors is larger than the second threshold.

In an embodiment, the partition edge is extended into a current template with an extended portion in the current template. The current template can include samples in a left neighboring reconstructed block and/or an above neighboring reconstructed block of the current block. The subset of width candidates can be determined based on a difference of sample values across the extended portion of the partition edge. The samples are in the current template. In an example, a first sample difference threshold is less than a second sample difference threshold. The subset of width candidates is determined as a fourth subset of width candidates if an absolute value of the difference of sample values is less than the first sample difference threshold. The subset of width candidates is determined as a fifth subset of width candidates if the absolute value of the difference of sample values is larger than or equal to the first threshold and is less than or equal to the second sample difference threshold. The subset of width candidates is determined as a sixth subset of width candidates if the absolute value of the difference of sample values is larger than the second sample difference threshold.

In an example, a partition of the current block is predicted by intra prediction. Three largest width candidates can be selected from the predefined width candidate list as the subset of width candidates At (S1330), the width of the blending area can be determined by selecting a width candidate from the subset of width candidates.

At (S1340), samples within the blending area in the current block can be reconstructed by applying a blending process using the selected width candidate.

The process (1300) proceeds to (S1399), and terminates.

The process (1300) can be suitably adapted to various scenarios and steps in the process (1300) can be adjusted accordingly. One or more of the steps in the process (1300) can be adapted, omitted, repeated, and/or combined. Any suitable order can be used to implement the process (1300). Additional step(s) can be added.

Embodiments in the disclosure may be used separately or combined in any order. Further, each of the methods (or embodiments), an encoder, and a decoder may be implemented by processing circuitry (e.g., one or more processors or one or more integrated circuits). In one example, the one or more processors execute a program that is stored in a non-transitory computer-readable medium.

The techniques described above, can be implemented as computer software using computer-readable instructions and physically stored in one or more computer-readable media. For example, FIG. 14 shows a computer system (1400) suitable for implementing certain embodiments of the disclosed subject matter.

The computer software can be coded using any suitable machine code or computer language, that may be subject to assembly, compilation, linking, or like mechanisms to create code comprising instructions that can be executed directly, or through interpretation, micro-code execution, and the like, by one or more computer central processing units (CPUs), Graphics Processing Units (GPUs), and the like.

The instructions can be executed on various types of computers or components thereof, including, for example, personal computers, tablet computers, servers, smartphones, gaming devices, internet of things devices, and the like.

Figure 14:
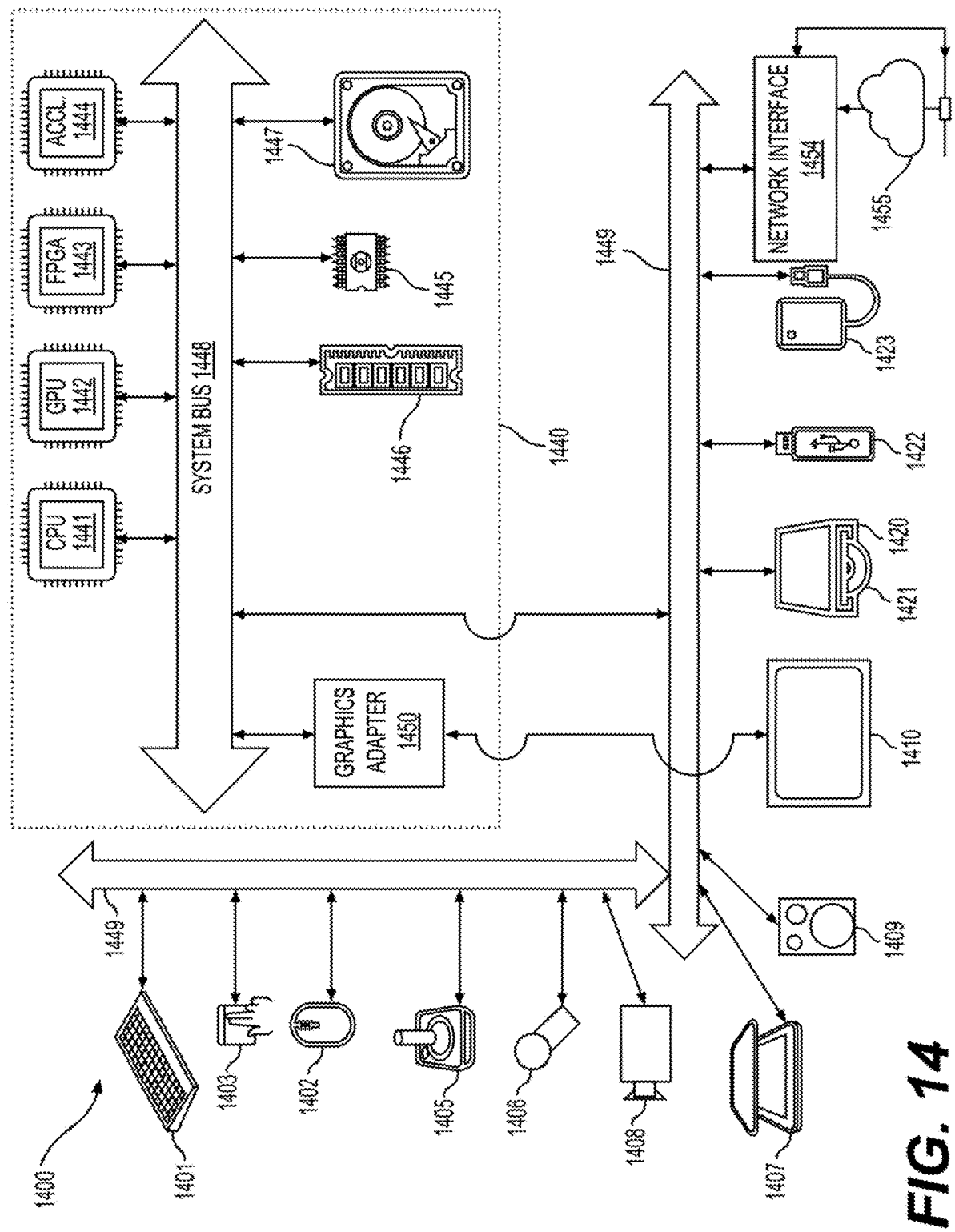
FIG. 14 is a schematic illustration of a computer system in accordance with an embodiment.

The components shown in FIG. 14 for computer system (1400) are exemplary in nature and are not intended to suggest any limitation as to the scope of use or functionality of the computer software implementing embodiments of the present disclosure. Neither should the configuration of components be interpreted as having any dependency or requirement relating to any one or combination of components illustrated in the exemplary embodiment of a computer system (1400).

Computer system (1400) may include certain human interface input devices. Such a human interface input device may be responsive to input by one or more human users through, for example, tactile input (such as: keystrokes, swipes, data glove movements), audio input (such as: voice, clapping), visual input (such as: gestures), olfactory input (not depicted). The human interface devices can also be used to capture certain media not necessarily directly related to conscious input by a human, such as audio (such as: speech, music, ambient sound), images (such as: scanned images, photographic images obtain from a still image camera), video (such as two-dimensional video, three-dimensional video including stereoscopic video).

Input human interface devices may include one or more of (only one of each depicted): keyboard (1401), mouse (1402), trackpad (1403), touch screen (1410), data-glove (not shown), joystick (1405), microphone (1406), scanner (1407), camera (1408).

Computer system (1400) may also include certain human interface output devices. Such human interface output devices may be stimulating the senses of one or more human users through, for example, tactile output, sound, light, and smell/taste. Such human interface output devices may include tactile output devices (for example tactile feedback by the touch-screen (1410), data-glove (not shown), or joystick (1405), but there can also be tactile feedback devices that do not serve as input devices), audio output devices (such as: speakers (1409), headphones (not depicted)), visual output devices (such as screens (1410) to include CRT screens, LCD screens, plasma screens, OLED screens, each with or without touch-screen input capability, each with or without tactile feedback capability—some of which may be capable to output two dimensional visual output or more than three dimensional output through means such as stereographic output; virtual-reality glasses (not depicted), holographic displays and smoke tanks (not depicted)), and printers (not depicted).

Computer system (1400) can also include human accessible storage devices and their associated media such as optical media including CD/DVD ROM/RW (1420) with CD/DVD or the like media (1421), thumb-drive (1422), removable hard drive or solid state drive (1423), legacy magnetic media such as tape and floppy disc (not depicted), specialized ROM/ASIC/PLD based devices such as security dongles (not depicted), and the like.

Those skilled in the art should also understand that term "computer readable media" as used in connection with the presently disclosed subject matter does not encompass transmission media, carrier waves, or other transitory signals.

Computer system (1400) can also include an interface (1454) to one or more communication networks (1455). Networks can for example be wireless, wireline, optical. Networks can further be local, wide-area, metropolitan, vehicular and industrial, real-time, delay-tolerant, and so on. Examples of networks include local area networks such as Ethernet, wireless LANs, cellular networks to include GSM, 3G, 4G, 5G, LTE and the like, TV wireline or wireless wide area digital networks to include cable TV, satellite TV, and terrestrial broadcast TV, vehicular and industrial to include CANBus, and so forth. Certain networks commonly require external network interface adapters that attached to certain general purpose data ports or peripheral buses (1449) (such as, for example USB ports of the computer system (1400)); others are commonly integrated into the core of the computer system (1400) by attachment to a system bus as described below (for example Ethernet interface into a PC computer system or cellular network interface into a smartphone computer system). Using any of these networks, computer system (1400) can communicate with other entities. Such communication can be uni-directional, receive only (for example, broadcast TV), uni-directional send-only (for example CANbus to certain CANbus devices), or bi-directional, for example to other computer systems using local or wide area digital networks. Certain protocols and protocol stacks can be used on each of those networks and network interfaces as described above.

Aforementioned human interface devices, human-accessible storage devices, and network interfaces can be attached to a core (1440) of the computer system (1400).

The core (1440) can include one or more Central Processing Units (CPU) (1441), Graphics Processing Units (GPU) (1442), specialized programmable processing units in the form of Field Programmable Gate Areas (FPGA) (1443), hardware accelerators for certain tasks (1444), graphics adapters (1450), and so forth. These devices, along with Read-only memory (ROM) (1445), Random-access memory (1446), internal mass storage such as internal non-user accessible hard drives, SSDs, and the like (1447), may be connected through a system bus (1448). In some computer systems, the system bus (1448) can be accessible in the form of one or more physical plugs to enable extensions by additional CPUs, GPU, and the like. The peripheral devices can be attached either directly to the core's system bus (1448), or through a peripheral bus (1449). In an example, the screen (1410) can be connected to the graphics adapter (1450). Architectures for a peripheral bus include PCI, USB, and the like.

CPUs (1441), GPUs (1442), FPGAs (1443), and accelerators (1444) can execute certain instructions that, in combination, can make up the aforementioned computer code. That computer code can be stored in ROM (1445) or RAM (1446). Transitional data can also be stored in RAM (1446), whereas permanent data can be stored for example, in the internal mass storage (1447). Fast storage and retrieve to any of the memory devices can be enabled through the use of cache memory, that can be closely associated with one or more CPU (1441), GPU (1442), mass storage (1447), ROM (1445), RAM (1446), and the like.

The computer readable media can have computer code thereon for performing various computer-implemented operations. The media and computer code can be those specially designed and constructed for the purposes of the present disclosure, or they can be of the kind well known and available to those having skill in the computer software arts.

As an example and not by way of limitation, the computer system having architecture (1400), and specifically the core (1440) can provide functionality as a result of processor(s) (including CPUs, GPUs, FPGA, accelerators, and the like) executing software embodied in one or more tangible, computer-readable media. Such computer-readable media can be media associated with user-accessible mass storage as introduced above, as well as certain storage of the core (1440) that are of non-transitory nature, such as core-internal mass storage (1447) or ROM (1445). The software implementing various embodiments of the present disclosure can be stored in such devices and executed by core (1440). A computer-readable medium can include one or more memory devices or chips, according to particular needs. The software can cause the core (1440) and specifically the processors therein (including CPU, GPU, FPGA, and the like) to execute particular processes or particular parts of particular processes described herein, including defining data structures stored in RAM (1446) and modifying such data structures according to the processes defined by the software. In addition or as an alternative, the computer system can provide functionality as a result of logic hardwired or otherwise embodied in a circuit (for example: accelerator (1444)), which can operate in place of or together with software to execute particular processes or particular parts of particular processes described herein. Reference to software can encompass logic, and vice versa, where appropriate. Reference to a computer-readable media can encompass a circuit (such as an integrated circuit (IC)) storing software for execution, a circuit embodying logic for execution, or both, where appropriate. The present disclosure encompasses any suitable combination of hardware and software.

While this disclosure has described several exemplary embodiments, there are alterations, permutations, and various substitute equivalents, which fall within the scope of the disclosure. It will thus be appreciated that those skilled in the art will be able to devise numerous systems and methods which, although not explicitly shown or described herein, embody the principles of the disclosure and are thus within the spirit and scope thereof.

What is claimed is:

1. A method for video decoding, comprising:
  receiving a video bitstream comprising a current block in a current picture;
  decoding a value of a syntax element associated with the current block in the current picture, the syntax element indicating whether the current block is coded with a geometric partition mode (GPM) along a partition edge intersecting the current block; and
  when the value of the syntax element indicating that the current block is coded with the GPM and a condition for adaptive blending is satisfied,
    reordering width candidates in a width candidate list using template matching (TM) that is based on a current template of the current block and reference templates that correspond to the respective width candidates;
    selecting a width candidate from the reordered width candidate list;
    determining a width of a blending area based on the selected width candidate, the blending area surrounding the partition edge as defined by boundaries on both sides of the partition edge, the boundaries being parallel to the partition edge, the width of the blending area measured perpendicular to the partition edge;
    determining the blending area based on the width of the blending area; and
    reconstructing samples within the blending area in the current block by applying the adaptive blending using the determined blending area.

2. The method of claim 1, wherein the reordering the width candidates comprises:
  extending the partition edge from the current block into the current template, an extended portion of the partition edge being in the current template;
  for each width candidate in the width candidate list,
    determining a reference template corresponding to the respective width candidate based on the GPM and the current template, reference samples within a template blending area that surround the extended portion of the partition edge being determined based on a blending process, the template blending area being in the reference template, a width of the template blending area being based on the respective width candidate; and
    determining a TM cost corresponding to the respective width candidate based on the current template and the reference template; and
  reordering the width candidate list based on the determined TM costs.

3. The method of claim 1, further comprising
  when the condition for the adaptive blending is not satisfied,
    determining the width of the blending area based on the width candidate list without reordering the width candidates in the width candidate list; and
    reconstructing the samples within the blending area in the current block by applying a blending process.

4. The method of claim 3, wherein
coding information of the current block indicates whether the condition for the adaptive blending is satisfied.

5. The method of claim 3, wherein
when an extended portion of the partition edge intersects the current template,
  an area between a first boundary and a second boundary that are parallel to the partition edge includes a first area and a second area, the area including the extended portion of the partition edge, the first boundary and the second boundary being on opposite sides of the partition edge and having a distance of the largest width candidate in the width candidate list from the partition edge,
  the first area is an area between the first boundary and the partition edge that overlaps with the current template,
  the second area is an area between the second boundary and the partition edge that overlaps with the current template,
  the condition for the adaptive blending is satisfied based on the first area being equal to the second area; and
  the condition for the adaptive blending is not satisfied based on the first area being not equal to the second area; and
when the extended portion of the partition edge does not intersect the current template, the condition for the adaptive blending is not satisfied.

6. The method of claim 3, wherein
the condition for the adaptive blending is not satisfied when an above template above the current block or a left template to the left of the current block is not available.

7. The method of claim 2, wherein
the width of the blending area is based on N1 width candidates in the reordered width candidate list, N1 being less than a number of the width candidates in the width candidate list, TM costs corresponding to the N1 width candidates being less than or equal to one or more TM costs corresponding to one or more remaining width candidates in the reordered width candidate list.

8. The method of claim 2, wherein:
the selected width candidate is a width candidate with the smallest TM cost in the reordered width candidate list.

9. A method for video decoding, comprising:
decoding coding information of a current block in a current picture, the coding information indicating that the current block is coded with a geometric partition mode (GPM) along a partition edge, a blending area that surrounds the partition edge being defined by boundaries on both sides of the partition edge, the boundaries being parallel to the partition edge, a width of the blending area measured perpendicular to the partition edge being based on a predefined width candidate list including width candidates;
determining a subset of width candidates based on the predefined width candidate list, a number of width candidates in the subset of width candidates being less than a number of the width candidates in the predefined width candidate list;

determining the width of the blending area by selecting a width candidate from the subset of width candidates; and reconstructing samples within the blending area in the current block by applying a blending process using the selected width candidate.

10. The method of claim 9, wherein the determining the subset of width candidates comprises:
selecting N2 smallest width candidates from the predefined width candidate list as the subset of width candidates when a screen content coding tool is enabled for a plurality of blocks including the current block.

11. The method of claim 9, wherein the determining the subset of width candidates comprises:
determining the subset of width candidates based on a difference of two motion vectors of a first prediction mode and a second prediction mode used in the GPM to reconstruct the current block.

12. The method of claim 11, wherein
screen content coding tools are disabled for the current block,
a first threshold is less than a second threshold, and
the determining the subset of width candidates includes:
determining the subset of width candidates as a first subset of width candidates when the difference of the two motion vectors is less than the first threshold;
determining the subset of width candidates as a second subset of width candidates different from the first subset when the difference of the two motion vectors is larger than or equal to the first threshold and is less than or equal to the second threshold; and
determining the subset of width candidates as a third subset of width candidates different from the first subset and the second subset when the difference of the two motion vectors is larger than the second threshold.

13. The method of claim 9, wherein
the partition edge is extended into a current template with an extended portion in the current template, the current template including samples in a left neighboring reconstructed block or an above neighboring reconstructed block of the current block, and
the determining the subset of width candidates includes determining the subset of width candidates based on a difference of sample values across the extended portion of the partition edge, the samples being in the current template.

14. The method of claim 13, wherein
a first sample difference threshold is less than a second sample difference threshold, and
the determining the subset of width candidates includes:
determining the subset of width candidates as a fourth subset of width candidates when an absolute value of the difference of sample values is less than the first sample difference threshold;
determining the subset of width candidates as a fifth subset of width candidates different from the fourth subset when the absolute value of the difference of sample values is larger than or equal to the first sample difference threshold and is less than or equal to the second sample difference threshold; and
determining the subset of width candidates as a sixth subset of width candidates different from the fourth subset and the fifth subset when the absolute value of the difference of sample values is larger than the second sample difference threshold.

15. The method of claim 9, wherein
a partition of the current block is predicted by intra prediction, and
the determining the subset of width candidates includes selecting three largest width candidates from the predefined width candidate list as the subset of width candidates.

16. A method for video encoding, comprising:
when a current block is coded with a geometric partition mode (GPM) along a partition edge intersecting the current block and a condition for adaptive blending is satisfied,
reordering width candidates in a width candidate list using template matching (TM) that is based on a current template of the current block and reference templates that correspond to the respective width candidates;
selecting a width candidate from the reordered width candidate list;
determining a width of a blending area based on the selected width candidate, the blending area surrounding the partition edge as defined by boundaries on both sides of the partition edge, the boundaries being parallel to the partition edge, the width of the blending area measured perpendicular to the partition edge;
determining the blending area based on the width of the blending area; and
encoding samples within the blending area in the current block by applying the adaptive blending using the determined blending area.

17. The method of claim 16, wherein the reordering the width candidates comprises:
extending the partition edge from the current block into the current template, an extended portion of the partition edge being in the current template;
for each width candidate in the width candidate list,
determining a reference template corresponding to the respective width candidate based on the GPM and the current template, reference samples within a template blending area that surround the extended portion of the partition edge being determined based on a blending process, the template blending area being in the reference template, a width of the template blending area being based on the respective width candidate; and
determining a TM cost corresponding to the respective width candidate based on the current template and the reference template; and
reordering the width candidate list based on the determined TM costs.

18. The method of claim 16, further comprising
when the condition for the adaptive blending is not satisfied,
determining the width of the blending area based on the width candidate list without reordering the width candidates in the width candidate list; and
encoding the samples within the blending area in the current block by applying a blending process.

19. The method of claim 17, wherein
the width of the blending area is based on N1 width candidates in the reordered width candidate list, N1 being less than a number of the width candidates in the width candidate list, TM costs corresponding to the N1 width candidates being less than or equal to one or more TM costs corresponding to one or more remaining width candidates in the reordered width candidate list.

20. The method of claim 17, wherein:
the selected width candidate is a width candidate with the smallest TM cost in the reordered width candidate list.

* * * * *